United States Patent
Vleugels et al.

(10) Patent No.: US 9,913,215 B2
(45) Date of Patent: *Mar. 6, 2018

(54) METHOD AND APPARATUS FOR COORDINATING A WIRELESS PAN NETWORK AND A WIRELESS LAN NETWORK

(71) Applicant: Atmel Corporation, San Jose, CA (US)

(72) Inventors: Katelijn Vleugels, San Carlos, CA (US); Roel Peeters, San Carlos, CA (US)

(73) Assignee: Atmel Corporation, San Jose, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/589,832

(22) Filed: Jan. 5, 2015

(65) Prior Publication Data
US 2015/0195853 A1 Jul. 9, 2015

Related U.S. Application Data

(63) Continuation of application No. 13/340,465, filed on Dec. 29, 2011, now Pat. No. 8,929,350, which is a (Continued)

(51) Int. Cl.
*H04W 52/02* (2009.01)
*H04W 28/26* (2009.01)
(Continued)

(52) U.S. Cl.
CPC ....... *H04W 52/0209* (2013.01); *H04W 28/26* (2013.01); *H04W 74/06* (2013.01);
(Continued)

(58) Field of Classification Search
None
See application file for complete search history.

(56) References Cited

U.S. PATENT DOCUMENTS 6,272,140 B1 8/2001 LaRowe, Jr. et al.
6,300,864 B1 10/2001 Willey
(Continued)

FOREIGN PATENT DOCUMENTS

EP 1207654 5/2002
WO WO 97/48198 12/1997
(Continued)

OTHER PUBLICATIONS

Advisory Action in U.S. Appl. No. 11/376,753, dated Apr. 30, 2010.
(Continued)

*Primary Examiner* — Kodzovi Acolatse
(74) *Attorney, Agent, or Firm* — Fish & Richardson P.C.

(57) ABSTRACT

Devices of a personal area network (PAN) use a wireless medium that is shared with a wireless local area network (WLAN). WLAN devices communicate using protocols of the WLAN and PAN devices communicate using PAN protocols allowing for lower power transmissions over the wireless medium relative to transmissions over the WLAN. A PAN coordinator device obtains access to the wireless medium for the PAN devices by signalling a reservation of the medium by the PAN coordinator device, such that the other devices defer use of the wireless medium, including at least one WLAN device, for a reservation period. During the reservation period, the communication is done using the PAN protocol. The signalling can be implicit in that the PAN coordinator device transmits one or more frame using the PAN protocol but that is at least partially understandable by WLAN devices such that they defer upon receipt of one or more of the PAN protocol frames, which may be a standard or modified HCCA-CF poll frame, a CTS frame with an increased duration field, or other variation. A PAN coordinator might also signal an access point to set up a DLS link
(Continued)

between the PAN coordinator and itself and use the DLS period for PAN traffic.

18 Claims, 19 Drawing Sheets

Related U.S. Application Data continuation of application No. 11/423,813, filed on Jun. 13, 2006, now abandoned, which is a continuation of application No. 11/376,737, filed on Mar. 14, 2006, now abandoned.

(60) Provisional application No. 60/661,746, filed on Mar. 14, 2005.

(51) Int. Cl.

| | | |
|---|---|---|
| *H04W 92/02* | (2009.01) | |
| *H04W 74/06* | (2009.01) | |
| *H04W 72/12* | (2009.01) | |
| *H04W 84/10* | (2009.01) | |
| *H04W 84/12* | (2009.01) | |
| *H04W 84/20* | (2009.01) | |
| *H04W 84/22* | (2009.01) | |
| *H04W 88/04* | (2009.01) | |
| *H04W 88/06* | (2009.01) | |
| *H04W 88/10* | (2009.01) | |
| *H04W 84/18* | (2009.01) | |

(52) U.S. Cl.
CPC ............ *H04W 92/02* (2013.01); *H04W 72/12* (2013.01); *H04W 84/10* (2013.01); *H04W 84/12* (2013.01); *H04W 84/18* (2013.01); *H04W 84/20* (2013.01); *H04W 84/22* (2013.01); *H04W 88/04* (2013.01); *H04W 88/06* (2013.01); *H04W 88/10* (2013.01); *Y02B 60/50* (2013.01)

(56) References Cited

U.S. PATENT DOCUMENTS

| | | |
|---|---|---|
| 6,505,253 B1 | 1/2003 | Chiu et al. |
| 6,842,460 B1 | 1/2005 | Olkkonen et al. |
| 7,020,451 B2 | 3/2006 | Sugar et al. |
| 7,039,358 B1 | 5/2006 | Shellhammer et al. |
| 2004/0076136 A1 | 4/2004 | Beach |
| 2004/0116075 A1 | 6/2004 | Shoemake et al. |
| 2004/0170120 A1 | 9/2004 | Reunamaki et al. |
| 2005/0025104 A1 | 2/2005 | Fischer et al. |
| 2005/0025174 A1 | 2/2005 | Fischer et al. |
| 2005/0170776 A1 | 8/2005 | Siorpaes |
| 2005/0176371 A1 | 8/2005 | Palin et al. |
| 2005/0176473 A1 | 8/2005 | Melpignano |
| 2005/0190724 A1 | 9/2005 | Hansen |
| 2005/0286474 A1 | 12/2005 | van Zelst et al. |
| 2006/0030266 A1* | 2/2006 | Desai ................ H04W 16/14 455/41.2 |
| 2006/0114981 A1 | 6/2006 | Ghosh |
| 2006/0120334 A1 | 6/2006 | Wang et al. |
| 2006/0146868 A1 | 7/2006 | Ginzburg |
| 2006/0165035 A1 | 7/2006 | Chandra et al. |
| 2006/0194600 A1* | 8/2006 | Palin ................ H04W 16/14 455/512 |
| 2006/0203841 A1 | 9/2006 | Fischer |
| 2006/0215601 A1 | 9/2006 | Vleugels et al. |
| 2006/0227753 A1 | 10/2006 | Vleugels et al. |
| 2008/0144493 A1 | 6/2008 | Yeh |
| 2008/0291858 A1 | 11/2008 | Kandala et al. |
| 2009/0086619 A1 | 4/2009 | Santhoff et al. |
| 2015/0223164 A1 | 8/2015 | Vleugels et al. |

FOREIGN PATENT DOCUMENTS

| | | |
|---|---|---|
| WO | WO 03/065654 | 8/2003 |
| WO | WO 2004/021720 | 3/2004 |
| WO | WO 2006/099588 | 9/2006 |

OTHER PUBLICATIONS

Advisory Action in U.S. Appl. No. 11/376,737, dated Nov. 9, 2010, 3 pages.
Chinese Office Action in Chinese Application No. 200680013461.6, dated May 12, 2010, 24 pages.
Extended European Search Report, dated Jul. 18, 2013, 9 pages.
Examiner Interview in U.S. Appl. No. 11/376,753, dated Jul. 12, 2010.
Final Office Action in U.S. Appl. No. 11/376,753, dated Aug. 24, 2012, 15 pages.
Final Office Action in U.S. Appl. No. 11/376,753, dated Nov. 24, 2009, 13 pages.
Final office action in U.S. Appl. No. 11/376,753, dated Jul. 16, 2014, 15 pages.
Final Office Action in U.S. Appl. No. 11/423,785 dated Sep. 29, 2010.
Final Office Action in U.S. Appl. No. 11/423,813 dated Mar. 17, 2010.
Final Office Action in U.S. Appl. No. 13/340,465, dated Mar. 22, 2013, 22 pages.
Heile et al., "A presentation to the Mobile IP work Group", IETF45, Internet Engineering Task Force, IEEE 802.15 Working Group for Wireless Personal Area Networks, Jul. 16, 1999.
International Search Report and Written Opinion in International Application No. PCT/US20006/09786, dated Sep. 25, 2007, 9 pages.
Non-Final Office Action in U.S. Appl. No. 13/340,465 dated Dec. 19, 2013, 23 pages.
Notice of Allowance in U.S. Appl. No. 11/423,785 dated Mar. 24, 2014, 15 pgs.
Notice of allowance in U.S. Appl. No. 11/423,785, dated Jul. 18, 2014, 15 pages.
Office Action in U.S. Appl. No. 11/376,737, dated Apr. 1, 2010, 21 pages.
Office Action in U.S. Appl. No. 11/376,753, dated Apr. 14, 2009, 11 pages.
Office Action in U.S. Appl. No. 11/376,753, dated Nov. 7, 2013.
Office Action in U.S. Appl. No. 11/376,753, dated Dec. 20, 2011, 13 pages.
Office Action in U.S. Appl. No. 11/423,785 dated Mar. 22, 2010.
Office Action in U.S. Appl. No. 11/423,785, dated Sep. 2, 2009.
Office Action in U.S. Appl. No. 11/423,813 dated Jul. 21, 2009.
Office Action in U.S. Appl. No. 13/340,465 dated Jul. 20, 2012, 21 pages.
Office Action in U.S. Appl. No. 11/376,737, dated Apr. 15, 2011, 20 pages.
Office Action in U.S. Appl. No. 11/376,737, dated Sep. 3, 2009, 20 pages.
Restriction Requirement in U.S. Appl. No. 11/376,737, dated Mar. 19, 2009, 7 pages.
U.S. Appl. No. 11/376,759, filed Mar. 14, 2006, 79 pages.
U.S. Appl. No. 11/423,785, filed Jun. 13, 2006, 81 pages.
U.S. Appl. No. 11/423,813, filed Jun. 13, 2006, 78 pages.
U.S. Appl. No. 13/340,465, filed Dec. 29, 2011, 80 pages.
Zeino et al., "Functional Approach to a Hybrid Wireless Network for Mobile Stations", IEEE Personal, Indoor and Mobile Radio Communications / ICCC Wireless Computer Networks (PIMRC'94/WCN), The Hague, The Netherlands, pp. 994-998, Sep. 1994.

\* cited by examiner

PP- PWN Protocol (802.11x, etc.)
SP- SWN Protocol (802.11x, overlay, HS Protocol, etc.)

METHOD AND APPARATUS FOR COORDINATING A WIRELESS PAN NETWORK AND A WIRELESS LAN NETWORK

CROSS-REFERENCES TO RELATED APPLICATIONS

This application is a continuation of U.S. patent application Ser. No. 13/340,465 filed Dec. 29, 2011 which is a continuation of U.S. patent application Ser. No. 11/423,813 filed Jun. 13, 2006, which is a continuation of U.S. patent application Ser. No. 11/376,737, filed Mar. 14, 2006, which claims the benefit of and is a non-provisional of U.S. Patent Application Ser. No. 60/661,746 filed on Mar. 14, 2005, which is incorporated by reference in its entirety for all purposes.

FIELD OF THE INVENTION

The present invention relates generally to wireless communications and more particularly to coordinating different network uses of a common wireless medium.

BACKGROUND OF THE INVENTION

Wireless communication among electronic devices has been increasing as the benefits and conveniences of wireless communication become more preferred. A wireless communication system or wireless network is often described as containing nodes (or more precisely, circuitry associated with the concept of a node) and a wireless medium (WM) over which the nodes' circuitry communicate to convey information. Where some action or activity is described as happening at (or being done at) a node, it should be understood that the electronic device and/or network interface that is at (or simply is) the node is the circuitry that is performing the action or activity. For example, sending data from node A to node B means transmitting a signal from circuitry associated with node A and receiving that signal (or more precisely, the transmitted signal modified by the medium) using circuitry associated with node B.

The information conveyed between nodes can be digital data and digitized analog signals, or other forms of information, but communication system design often assumes that digital data is being conveyed and higher network layers interpret the data appropriately. For purposes herein, it is assumed that data exists at one node, is provided to lower network layers, is conveyed to another node over a WM, is received by another node correctly or incorrectly and then is conveyed to upper network layers at the receiver. In one model, two networked devices run applications that pass data between themselves by having the sending device's application convey data to an application layer of a network stack, which conveys data to lower levels, ultimately to a medium access control (MAC) layer and a physical network (PHY) layer, and the process is inverted at the recipient.

To set up a wireless network, all that is needed is a plurality of electronic "node" devices capable of transmitting and receiving data in a manner understood by the two (or more) nodes involved in a conversation, with the node devices appropriately placed such that they can communicate in the medium that exists between the devices. The medium could be some type of dielectric material, but more commonly, the medium is the air space and objects (walls, chairs, books, glass. etc.) that are between devices or are positioned such that they have an effect on the signals transmitted between devices. Presumably, the node devices are assigned unique identifiers to distinguish transmissions, but this might not always be necessary. Examples of such unique identifiers are MAC addresses and IP addresses.

As the existence of various wireless media and their properties are known and are not the focus of this disclosure, the medium is often just shown in the attached figures as a cloud. Thus, it should be understood that supplier of a set of two or more powered devices that can communicate supplies a wireless network; the wireless medium is presumed.

Wireless communication systems can be categorized based on coverage range, which in some cases is dictated by use. A wireless local area network or "WLAN", has a typical coverage range on the order of 300 feet and is useful for providing communications between computing devices in some (possibly loosely) defined space such as a home, office, building, park, airport, etc. In some modes of operation, one or more of the nodes is coupled to a wired network to allow other nodes to communicate beyond the wireless network range via that wired network. In 802.11 terminology, such nodes are referred to as "access points" and the typical protocol is such that the other nodes (referred to as "stations") associate with an access point and communication is generally between a station and an access point. Some wireless networks operate in an "ad hoc" mode, wherein node devices communicate with each other without an access point being present.

A personal area network or "PAN" is a short-range wireless network, with typical coverage ranges on the order of 30 feet, usable to connect peripherals to devices in close proximity, thereby eliminating cables usually present for such connections. For example, a PAN might be used to connect a headset to a mobile phone or music/audio player, a mouse or keyboard to a laptop, a PDA or laptop to a mobile phone (for syncing, phone number lookup or the like), etc. Yet another example of a wireless PAN application is wireless medical monitoring devices that wirelessly connect monitoring hardware to a pager or similar read-out device. Yet another example is a remote control that connects to a wireless-enabled electronic device.

Some networks might fall in a gray area between a WLAN and a PAN, but in many cases, a network is clearly one or the other. A personal area network (PAN) is generally used for the interconnection of information technology devices within the range of an individual person, typically within a range of 10 meters. For example, a person traveling with a laptop will likely be the sole user of that laptop and will be the same person handling the personal digital assistant (PDA) and portable printer that interconnect to the laptop without having to plug anything in, using some form of wireless technology. Typically, PAN nodes interact wirelessly, but nothing herein would preclude having some wired nodes. By contrast, a wireless LAN tends to be a local area network (LAN) that is connected without wires and serves multiple users.

Equipment connecting to a wireless communication system in general, and to a wireless PAN communication system in particular, is typically used for applications where power usage, weight, cost and user convenience are very important. For example, with laptops, low-cost accessories are preferable, and it is critical that the power usage of such accessories be minimized to minimize the frequency at which batteries need to be replaced or recharged. The latter is a burden and annoyance to the user and can significantly reduce the seamless user experience.

Weight and complexity are additional concerns in many wireless communication systems. Particularly with mobile devices such as laptops, weight is a concern and the user would rather not have to deal with the hassle of carrying around a multiplicity of devices. Mobile devices are devices that can be expected to be in use while moving, while portable devices are devices that are movable from place to place but generally are not moving when in use. The considerations for mobile devices also apply to portable devices, albeit sometimes with less of a concern. For example, with a wireless connection of a peripheral to a laptop, both devices are likely to be used while mobile or moved frequently and carried around. Thus, weight and the number of devices is an important consideration. With portable devices, such as a small desktop computer with a wireless trackball, as long as the total weight is below a user's carrying limit, the weight is not as much a concern. However, battery life is often as much a concern with portable devices as it is with mobile devices.

There are shades of grey between "portable" and "mobile" and it should be understood that the concerns of mobile applications and portable applications can be considered similar, except where indicated. In other words, a mobile device can be a portable device in the examples described herein.

Where a computing and/or communication device connects to a WLAN, it uses wireless circuitry that often times are already built into the computing device. If the circuitry is not built in, a WLAN card (such as a network interface card, or "NIC") might be used. Either way, some antenna circuitry is used and power is required to run that circuitry.

Where a device also connects wirelessly to peripherals or other devices over short links often referred to as forming a "personal area network" or "PAN", circuitry is needed for that connection as well. This circuitry is typically provided with an external interface unit that is plugged into or onto the device. For example, where the device is a laptop, the circuitry might be provided by a Universal Serial Bus (USB) dongle that attaches to a USB port of the laptop. The USB dongle contains the radio circuitry needed to communicate wirelessly over the short wireless links.

In general, a wireless connection between two or more devices requires that each device include wireless network circuitry for conveying signals over the medium and receiving signals over the medium, as well as processing/communication circuitry to receive, process and/or convey data and/or signals to that wireless network circuitry. The processing/communication circuitry could be implemented with actual circuits, software instructions executable by a processor, or some combination thereof. In some variations, the wireless network circuitry and processing/communication circuitry are integrated (such as with some PDAs, wireless mice, etc.) or are separate elements (such as a laptop as the processing/communication circuitry and a network PCMCIA card as the wireless network circuitry).

For ease of understanding this disclosure, where it is important to make the distinction between devices, a device that exists to provide wireless connectivity is referred to as a "network interface", "network interface device", "wireless network interface device" or the like, while the device for which the wireless connectivity is being provided is referred to as a "computing device" or an "electronic device" notwithstanding the fact that some such devices do more than just compute or might not be thought of as devices that do actual computing and further notwithstanding the fact that some network interface devices themselves have electronics and do computing. Some electronic devices compute and communicate via an attached network interface device while other electronic devices might have their network interface devices integrated in a non-detachable form. Where an electronic device is coupled to a wireless network interface to a wireless network, it is said that the device is a node in the network and thus that device is a "node device".

An 802.11x (x=a, b, g, n, etc.) NIC (network interface card) or 802.11x built-in circuitry might be used for networking an electronic device to the outside world, or at least to devices at other nodes of a WLAN 802.11x network, while using an external dongle or a similar interface device with Bluetooth or proprietary wireless circuitry for communication between the computing device and the peripheral or other PAN node.

A device that is equipped with an 802.11x-conformant network interface to the WM is herein referred to as a station or "STA". In 802.11 terminology, set of STAs constitutes a Basic Service Set ("BSS"). A set of STAs that communicate in a peer-to-peer configuration is referred to as an "802.11x ad-hoc" network or an independent BSS (IBSS). A set of STAs controlled by a single coordinator is referred to as an 802.11x infrastructure network. The coordinator of a BSS is herein referred to as the access point or "AP".

A typical access point device is wired to a wired network and is also wired to an external source of electricity, such as being plugged into a wall socket or wired to a building's power grid. For example, a building, an airport or other space people might occupy might have fixed access points mounted throughout the space to provide adequate network coverage for the purpose of providing access to the Internet or other network for the people occupying the space, via their portable or mobile devices. As such, access points are typically always on so that the wireless network is available whenever suitable portable or mobile devices are carried into the space.

The use of different technologies for WLAN and wireless PAN connectivity increases cost, weight and power usage (at the COORD side and/or the PER side), and impairs a seamless user experience. Those disadvantages could be resolved by equipping the peripheral or PAN nodes with 802.11x wireless circuitry, thus eliminating the dedicated PAN technologies altogether. However, PAN nodes are often very power-sensitive devices. They usually are battery-operated devices and their small form factor prohibits the use of bulky batteries with large capacity. Instead, small batteries with limited power capacity are used. Such peripherals cannot typically support the power usage requirements typical of WLAN wireless circuitry, such as 802.11x circuitry. A host of other difficulties are present in view of the optimizations, goals and designs of differing network protocols.

Another drawback is that independent LANs and PANs may interfere if they share a common frequency band.

BRIEF SUMMARY OF THE INVENTION

In embodiments of wireless communication according to the present invention, a computing device is interfaced to a wireless personal area network (PAN) in an environment wherein coexisting wireless local area networks (WLANs) might be present, and devices of the wireless PAN coordinate usage of the wireless medium with devices of the WLANs that are active in the same space, using the same, or part of the same, wireless medium. Coordination is achieved by the use of a wireless PAN communication protocol that is an overlay protocol that is only partially compliant with the WLAN protocol, but not entirely, in terms of power, frame contents and sequences, timing, etc. The WLAN might have an access device (infrastructure mode) or not (ad hoc mode). In either case, at least some of the WLAN devices would be able to interpret part of some PAN frames.

A given PAN device might also be a WLAN device, but it might also be the case that all of the wireless PAN devices operate within the wireless PAN. Coexisting WLANs can be 802.11x WLANs. The wireless PAN devices preferably use a protocol that is at least partially understood by nearby WLAN devices such that the WLAN devices will sense that the wireless medium is busy and will appropriately defer. The partially compliant protocol might be a protocol optimized for PAN traffic and devices.

To reduce interference, a computing device that is a coordinator in a wireless PAN network might determine to signal a WLAN operating in the same wireless networking medium such that devices therein defer access to the WM so that communication can occur within the wireless PAN network, determine a length of time for PAN-computing device communication, reserve the wireless medium for at least that length of time and use that time for communicating with the wireless PAN using protocols that overlap with conventional WLAN protocols but are not necessarily compliant.

Signalling to a coexisting WLAN and reservation of the common wireless medium can be implicit or explicit. Implicit signalling occurs when a wireless PAN device transmits a frame within the wireless PAN network using a wireless PAN overlay protocol, but at a minimum those portions of the overlay protocol that are required to trigger a nearby STA in a coexisting WLAN to defer accessing the WM are compliant with the WLAN protocol. A nearby STA in a coexisting WLAN, upon hearing an overlay protocol frame, will understand at least enough of the overlay protocol frame to defer use of a common wireless networking medium. Explicit signalling occurs when a computing device can join both networks, exchanges one or more frames in the WLAN network using the WLAN protocol to communicate times of wireless PAN traffic, and communicates with devices in the wireless PAN network using a wireless PAN overlay protocol during the times agreed on with the devices in the WLAN.

The secondary network (PAN) protocols might use 802.11x frames or modifications thereof, with new frame arrangements, frame sequences etc. adapted for PAN needs.

The secondary network (PAN) protocols might use synchronization and traffic scheduling methods to meet the power and latency requirements of specific wireless PAN applications. Such methods allow wireless PAN devices to agree on an inactivity time, during which at least part of the circuitry can be disabled, wherein disabling is such that less power per unit time is consumed by the network circuit relative to power consumed when not disabled.

The secondary network (PAN) protocols might support connectivity states that are different from or an extension of connectivity states supported by PWN (WLAN) protocols. Such connectivity states may be supported to meet typical SWN needs. Examples of typical SWN needs might include but are not limited to (1) reducing the power consumption of the devices in the SWN, (2) optimizing the network capacity, and (3) meeting the latency requirements of a PER device. There may be different reasons for supporting multiple connectivity states as well.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 3(a) is a block diagram showing elements of a PWN and an SWN that co-exist, but do not necessarily span the two networks; FIG. 3(b) is a block diagram showing specific objects that might be used as the elements of a PWN and an SWN; FIG. 3(c) is a block diagram of a variation of subparts wherein objects might span the PWN and the SWN; FIG. 3(d) is a block diagram showing further examples.

DESCRIPTION OF THE INVENTION

Figure 1:
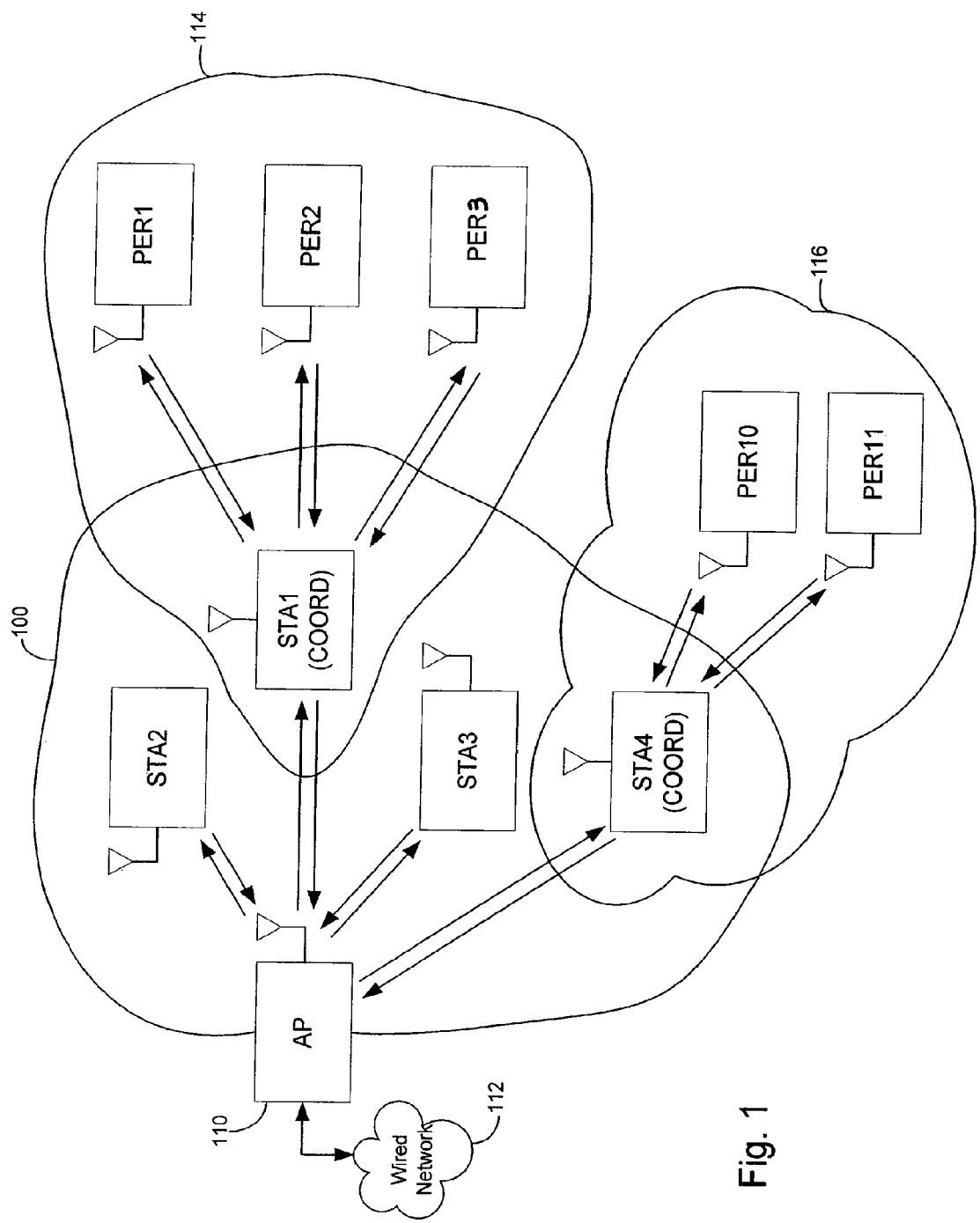
FIG. 1 is a block diagram illustrating various devices operating as part of a primary wireless network (PWN), a secondary wireless network (SWN), or both, wherein the SWN operates using an SWN protocol that co-exists with the PWN protocol.

The present disclosure describes methods and apparatus for operating a secondary wireless network ("SWN") in the presence of a primary wireless network ("PWN"), including features, elements, configurations and/or programming that allow for co-existence of SWN devices in a space where PWN traffic might occur, as well as features, elements, configurations and/or programming that include coordination between a PWN and an SWN (or pluralities of these) such that a device might handle traffic for each of the networks present.

For example, a computing device might have a common network interface that allows the computing device to be a node in the PWN and a node in the SWN. In a particular example, a computing device is an 802.11x STA that is a member of a PWN capable of associating with and communicating with an AP for that PWN (as well as possibly other devices in that PWN) using a network interface while also elements of that same network interface are used to simultaneously participate as a WPAN coordinator ("COORD") to coordinate the SWN, such that the COORD can communicate with members of one or more SWN without losing the COORD's connectivity to the primary network and using common hardware components to interface to both networks. Where a COORD is connectable to the PWN, it is referred to as a "dual-net" device, as it coordinates communication over the SWN such that it can be connected to both simultaneously, possibly including steps that involve signaling within the PWN as part of SWN activity (e.g., reserving the PWN to avoid interference before using the SWN).

In some instances, the COORD is not set up to connect to the PWN, but it still performs the necessary actions to coordinate traffic for the SWN it coordinates, including performing actions that improve coexistence of the PWN and SWN.

In the general example, the computing device is a portable and/or mobile computing and/or communications device with some computing capability. Examples of computing devices include laptop computers, desktop computers, handheld computing devices, pagers, cellular telephones, devices with embedded communications abilities and the like. Examples of peripheral devices include typical computer, telephone etc. accessories where wireless connections are desired, but might also include less common devices, such as wearable devices that communicate with other devices on a person or even to communicate with other nearby devices, possibly using the electrical conductivity of the human body as a data network. For example, two people could exchange information between their wearable computers without wires, by transmission through the air, or using their bodies and/or clothing.

The computing devices may interface to 802.11 WLANs or other wireless networks to communicate with other network nodes, including nodes accessible through wired connections to the wireless network (typically via an access point). The computing devices also may interface to PAN devices over a personal area network (PAN), such as wireless headsets, mice, keyboards, accessories, recorders, telephones and the like. A wide variety of PAN devices are contemplated that are adapted for short-range wireless communications, typically bi-directional and typically low power so as to conserve a PAN device's limited power source. Some PAN devices might be unidirectional, either receive-only or transmit-only, devices.

In a typical approach, where a STA needs to connect to more than one wireless network, the STA associates with one wireless network and then when associating with another wireless network, it disassociates with the first wireless network. While this is useful for a WLAN where a STA might move out of one network's range and into the range of another network, this is not desirable when latency needs to be less than an association set-up time. The latency incurred with this switching procedure easily amounts to several hundreds of milliseconds.

In certain applications, it may be desirable for a STA to connect to multiple networks without incurring long switching-induced latencies. For example, consider a typical PER device, that of a cordless mouse. Since update rates for a cordless mouse during normal operation are on the order of 50 to 125 times per second, switching-induced latencies involved with 802.11x association set ups are not acceptable. Furthermore, the switching overhead significantly reduces the STA's usable communication time, defined as the time that the STA is available to transmit or receive data.

In a specific embodiment of the invention, a wireless peripheral like a mouse, is attached to an 802.11x-enabled computing device like a laptop computer, using the 802.11x wireless circuitry inside the laptop, or connected to the laptop via a NIC card. At the same time, the laptop may be connected to the Internet via a regular WLAN network, using the same 802.11x circuitry. Herein, a peripheral or PAN node will be referred to as "PER". Multiple PERs can connect to a single wireless PAN. The wireless device coordinating the wireless PAN is called the coordinator ("COORD"). Where the COORD is also able to connect to the 802.11x network, the COORD is referred to as a "dual-net" device, since it handles both networks. A typical dual-net device in this example is a device that is a STA on an 802.11x network while also having wireless peripherals used by applications running on that device.

While not always required, the PERs are power-sensitive devices. It should be understood that an object labeled "PER" need not be a peripheral in the sense of an object with a purpose to serve a particular purpose, but rather an object that performs the behaviors herein referred to as behaviors of a PAN node. For example, a printer can be a PER when it is connected to a desktop computer via a PAN, but some other device not normally thought of as a peripheral can be a PER if it behaves as one.

Examples of the concepts and disclosures provided above will now be further explained with reference to the figures. In the figures, like items are referenced with a common reference number with parenthetical numbers to indicate different instances of the same or similar objects. Where the number of instances is not important for understanding the invention, the highest parenthetical number might be a letter, such as in "$100(1), 100(2), \ldots, 100(N)$". Unless otherwise indicated, the actual number of items can differ without departing from the scope of this disclosure.

Specifically, FIG. 1 illustrates various devices operating as part of a primary wireless network (PWN) 100, a secondary wireless network (SWN) (such as 114 or 116), or both. In the figure, an access point (AP) 110 supports an infrastructure mode for PWN 100, coupling various stations to the network allowing, for example, network traffic between a station and a wired network 112. By communicating with the AP, a station can retrieve information from the Internet and exchange data with other stations that may or may not be part of the Basic Service Set (BSS) managed by the AP.

As shown in the example, the stations present are STA1, STA2, STA3 and STA4. Each station is associated with a node in PWN 100 and has the necessary hardware, logic, power, etc. to be a node device in PWN 100. Station STA1 also coordinates SWN 114 as the COORD for that network shown comprising PER1, PER2 and PER3. Likewise, station STA4 coordinates SWN 116 as the COORD for the network comprising STA4, PER10 and PER11. In FIG. 1, each node device is shown with an antenna to indicate that it can communicate wirelessly, but it should be understood that an external antenna is not required.

Other network components and additional instances might also be present. For example, more than one AP might be present, there might be overlaps of BSSes and other network topologies might be used instead of the exact one shown in FIG. 1 without departing from the scope of the invention. Examples used herein for PWN 100 include 802.11x (x=a, b, g, n, etc.), but it should be understood that the primary wireless network may well be another network selected among those in present use or available when the primary wireless network is implemented.

In this example, the secondary wireless networks are assumed to be used for PAN functionality. The PAN can be used for, but is not limited to, fixed data rate applications where exchange of data can be scheduled and the amount of data to be exchanged is known and a single dual-net device might interface with multiple PERs. Because the dual-net device may be a regular STA in the first WLAN, it can power-down as needed without problems, unlike an access point. However, since it is also the COORD, peripheral communication could be lost if the peripheral is powered up but the dual-net device/COORD is not. This can be dealt with using mutually agreeable inactivity periods.

Figure 2:
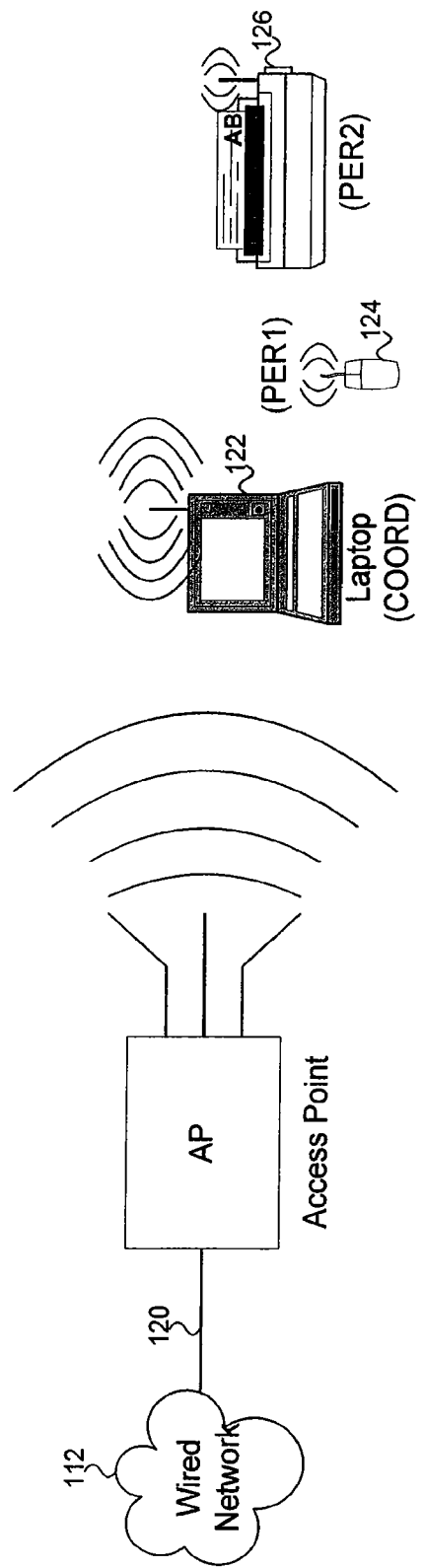
FIG. 2 is a block diagram illustrating a subpart of the elements of FIG. 1, in greater detail.

FIG. 1 shows, at a high level, the interplay among various nodes of various networks. FIG. 2 illustrates a subpart of the elements of FIG. 1, illustrating in greater detail. In this figure, AP 110 is coupled to wired network 112 via cable 120 and might communicate using any suitable wire-based networking protocol. On the other side, AP 110 transmits signals to a station device, in this case a laptop 122, using the AP's antenna and those signals are received by laptop 112 using its antenna. Signals can also flow in the other direction. Such communications would be done according to a PWN protocol, such as an 802.11x protocol.

Laptop 122 (a dual-net device in this example) in turn can communicate with the peripherals shown, in this example a wireless mouse (PER1) 124 and a wireless printer (PER2) 126. It may be that power for wireless printer 126 comes from an external power outlet, in which case power consumption might be less of a concern than with mouse 124 if it operates on battery power. Nonetheless, both peripherals might use the same power-saving protocol. Power conservation might also be performed on the dual-net device, for example, when it is a laptop.

FIGS. 3(a)-(d) comprise several views of network layouts of elements of a PWN and a SWN.

Figure 3A:
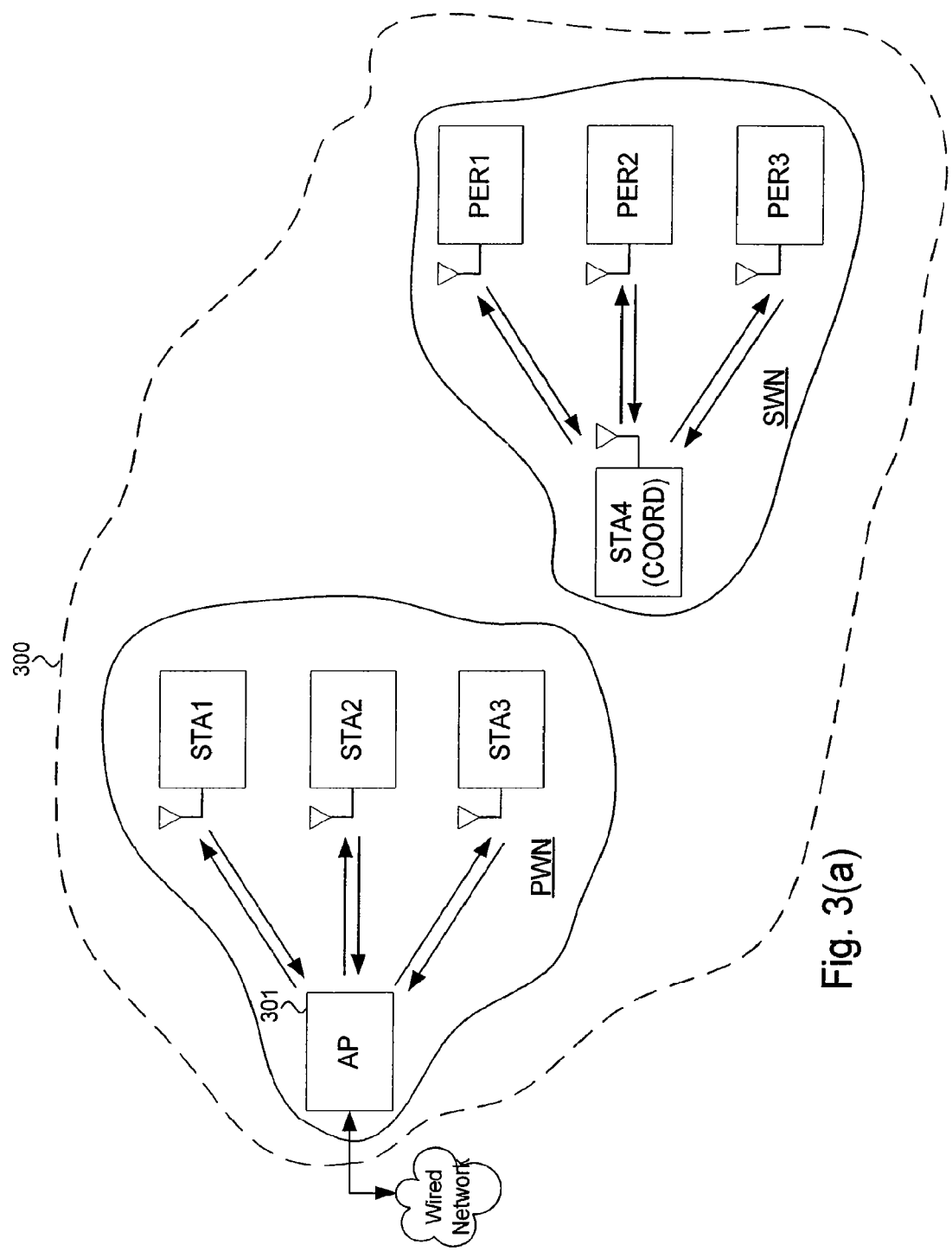
FIGS. 3(a)-(d) comprise several examples of elements of a PWN and an SWN.

FIG. 3(a) is a block diagram showing wireless elements that might be operating in a common space 300 such that they share a wireless medium or parts of it. In the description that follows, the examples assume that the range of an access point, AP 301, is the common space 300. In other examples, the common space is the range of the AP and STA devices in the AP's BSS, or some other variation. As shown in FIG. 3(a), AP, STA1, STA2 and STA3 form the primary wireless network PWN, while devices STA4, PER1, PER2, and PER3 form the secondary wireless network SWN. STA4 is the master for the SWN. Note that STA4 need not be associated as a STA with AP 301.

Figure 3B:
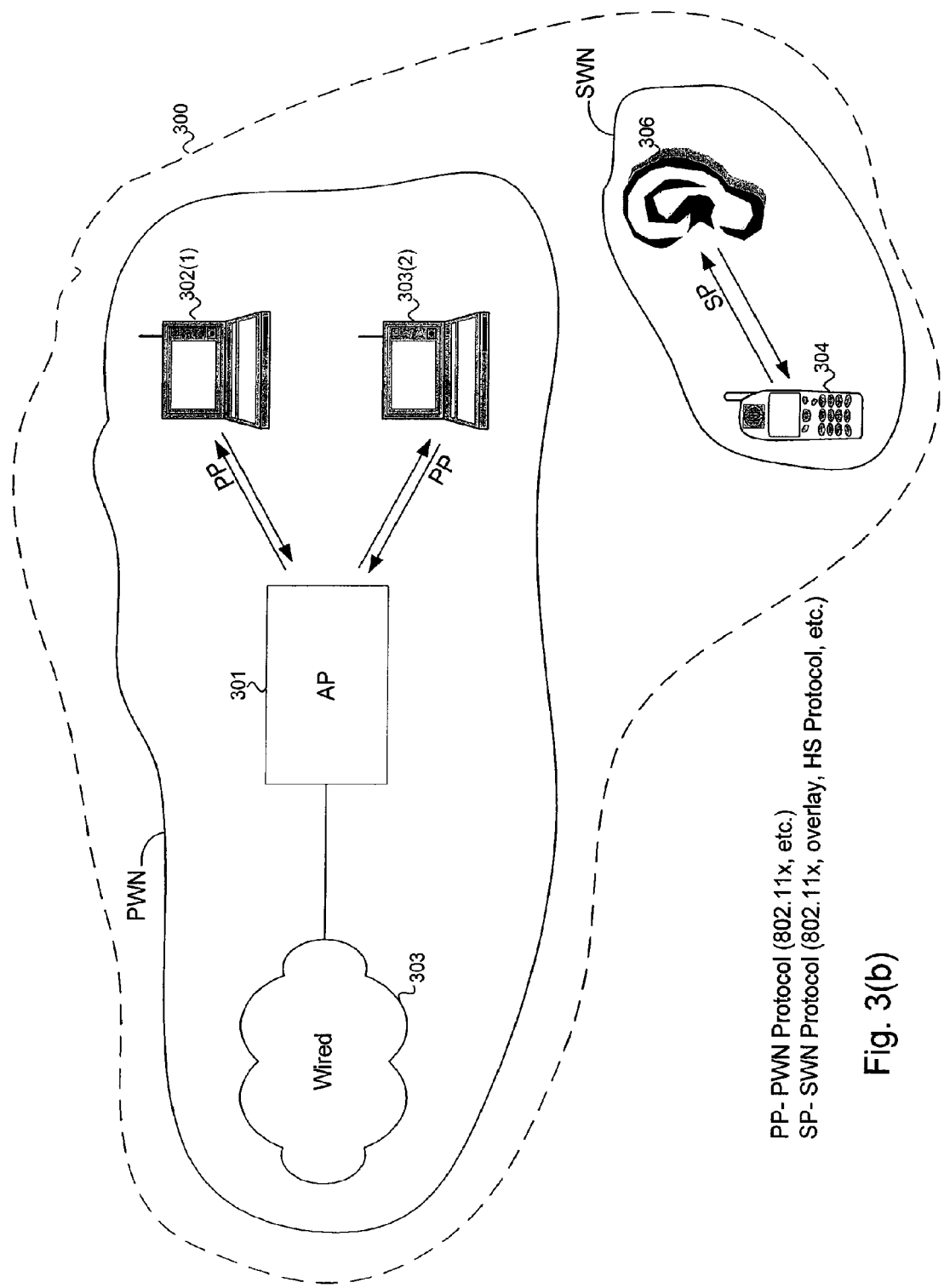

FIG. 3(b) illustrates a more specific example. In that figure, PWN is managed by AP 301 and has node devices 302(1) and 302(2) (laptops in this example figure) associated with the PWN. A mobile phone 304 is the master for the SWN that includes a headset 306. Mobile phone 304 may well not have the capability to join PWN, but since the PWN and SWN share the same wireless medium, preferably mobile phone 304 has COORD functions that would enhance coexistence of PWN devices and SWN devices. AP 301 is also coupled to a wired network 303.

The various protocols used between devices are marked as "PP" for PWN protocol, which might be an 802.11x protocol or the like and "SP" for SWN protocol, which might be a modified 802.11x protocol, an overlay protocol, or the like. As used herein, an overlay protocol is an SWN protocol that has elements that are reuses of elements of a PWN protocol to provide one or more advantages, such as ability to use some common hardware components for both networks, the ability to communicate in the SWN without having to disassociate with the PWN, the ability to signal in the SWN with signals that are understood by SWN devices but are such that they are, if not understood, are acted upon by PWN devices to provide desirable actions. For example, an overlay protocol might be such that a PWN-only device that hears an SWN packet will be able to decode the packet enough to determine that the packet is not for the PWN-only device and also determine how long the wireless medium will be busy with SWN traffic so that the PWN-only device can appropriately defer.

Of course, if all of the PWN devices and SWN devices had the same constraints and could support a wider-area network standard protocol, then perhaps all of the devices would just be nodes in one network and use that network's protocol for contention, coordination, and the like. However, where one-size-fits-all does not work, it is preferred that some sort of coexistence enhancement occur.

Figure 3C:
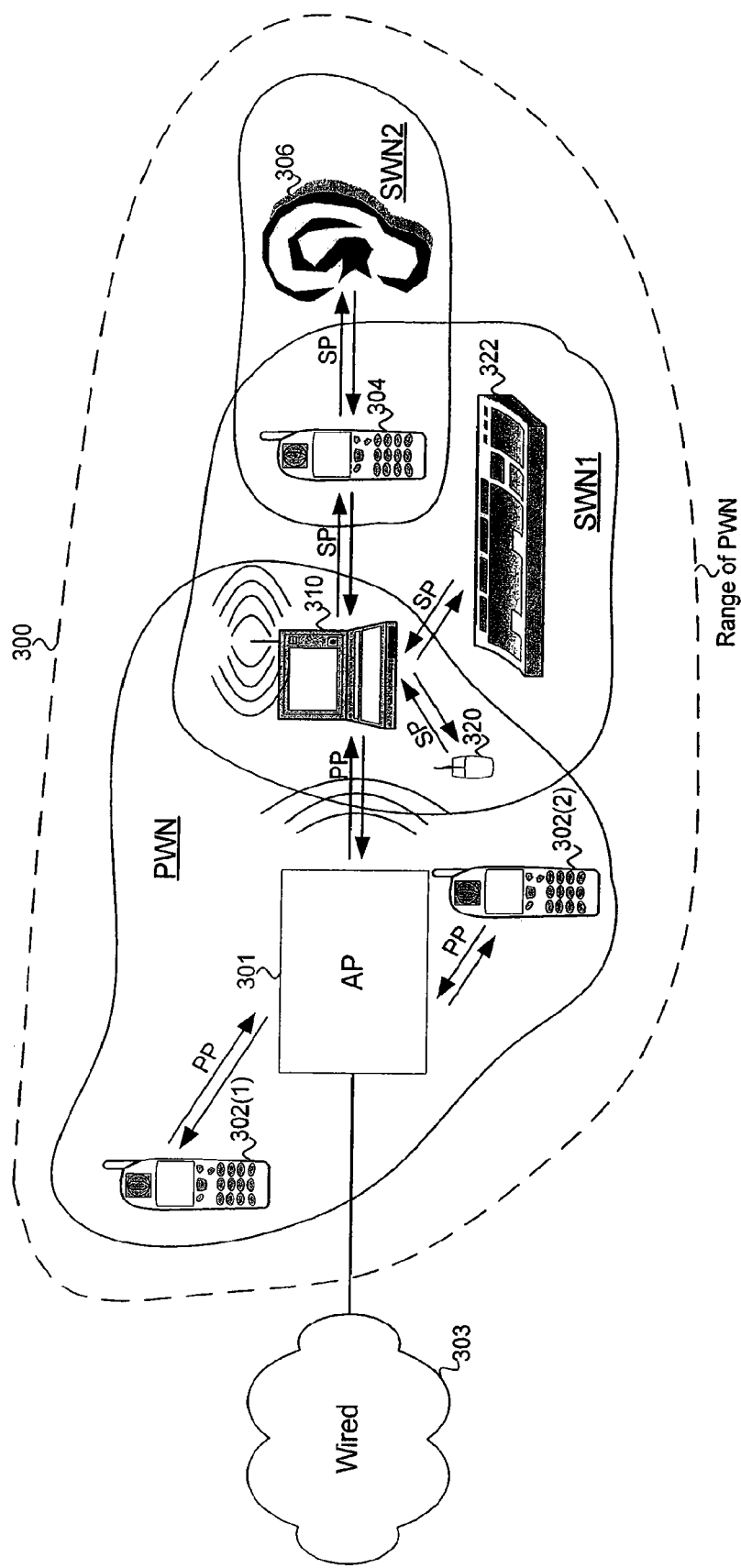

FIG. 3(c) is a block diagram of another topology example, wherein at least one device spans a network. In that example, AP 301 communicates with an 802.11x-enabled Personal Digital Assistant (PDA) 305 and an 802.11x-enabled mobile phone 307, while phone 307 acts as a COORD for a secondary network to interact with a wireless headset 306. In some variations, PDA 305 and phone 307 might communicate in ad hoc mode. As an example of the use of these elements, phone 307 might be used to simultaneously conduct a wireless Voice-over-IP (VoIP) call and attach wireless headset 306.

Figure 3D:
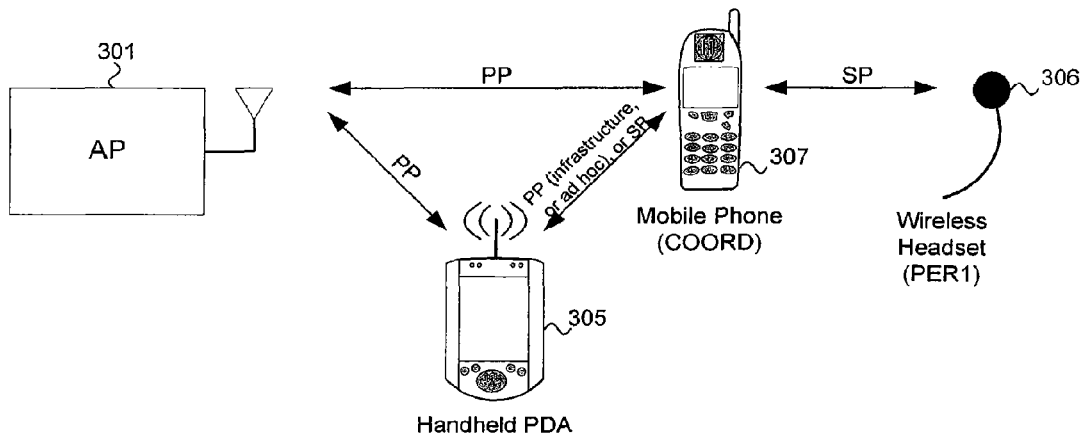

FIG. 3(d) is a block diagram illustrating a more complicated example. As shown there, AP 301 is coupled to wired network 303 and is wirelessly coupled with its associated stations: laptops 302(1) and 302(2), as well as a laptop 310 that is a COORD for a secondary wireless network, SWN1. Laptop 310 coordinates SWN1, which includes mouse 320, keyboard 322 and mobile phone 304. Mobile phone 304 can in turn be a COORD for another secondary wireless network, SWN2 while being a PER in SWN1. As shown, the communications with AP 301 use a PWN protocol, such as an 802.11x protocol, while the communications among devices in SWN1 and SWN2 are done using the SWN protocol. As explained elsewhere herein, there are many benefits of using an SWN protocol such as an 802.11x overlay instead of an all 802.11x protocol and by suitable design of the SWN protocol, the SWNs and the PWN can co-exist and, in the case of dual-net devices, can reuse common network interface devices for the dual-net device's participation in both a PWN and an SWN.

In the example of FIG. 3(d), it may be expected that mouse 320, keyboard 322, mobile phone 340 and headset 306 are not programmed for, and/or do not have circuits to support, use with an 802.11x primary network, but nonetheless they might use an SWN protocol that has many aspects in common with an 802.11x protocol, modified to accommodate the different needs of SWN devices while providing a measure of co-existence. The network interface for a dual-net device might comprise standard hardware for interfacing to the PWN and software to control that standard hardware to use it for SWN protocol traffic. Thus, with the selection of the SWN protocol such as those described or suggested herein, SWN support can be added to a computing device without requiring any new hardware.

Figure 4:
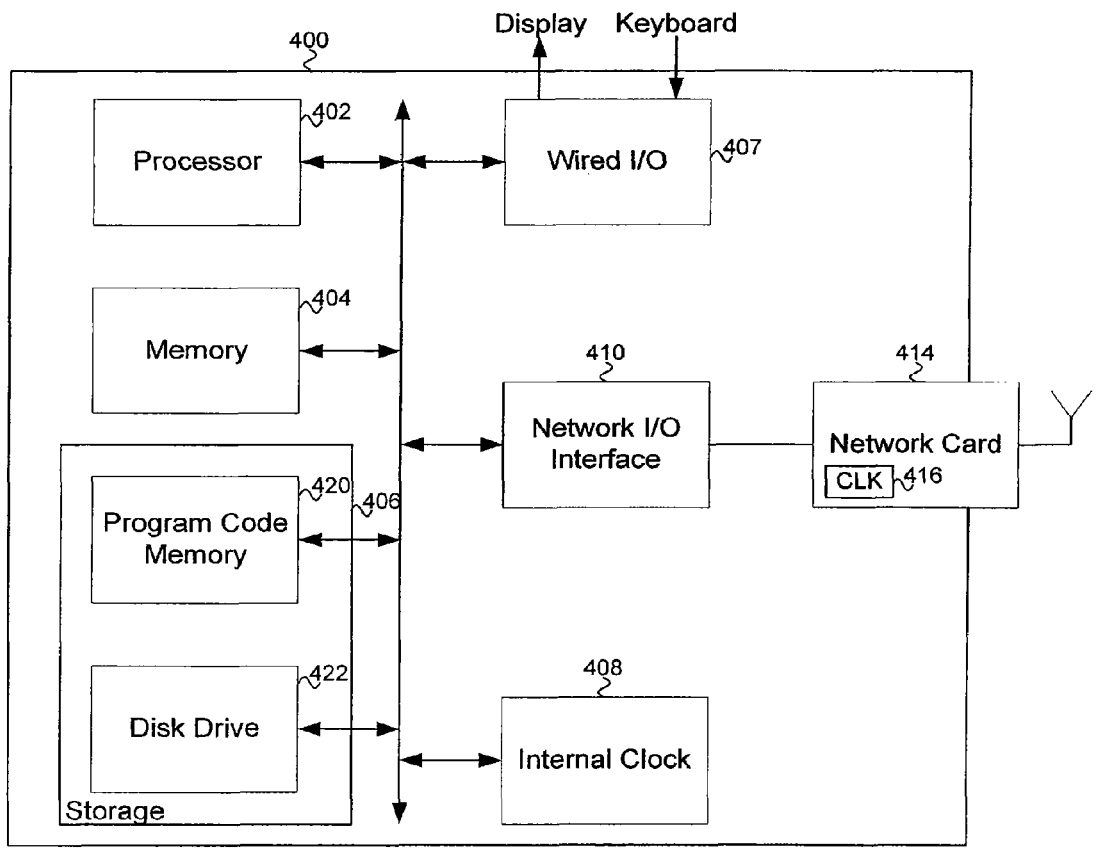
FIG. 4 is a block diagram of an example wireless PAN coordinator ("COORD") that might also operate as a dual-net device that could simultaneously maintain connections with a PWN and a SWN.

FIG. 4 illustrates an example of the internal details of a COORD device. As explained herein, such devices might include laptops, desktop computers, terminals, MP3 players, home entertainment systems, music devices, mobile phones, game consoles, network extenders or the like. What is shown is one example. In this example, a COORD device 400 is shown comprising a processor 402, the memory 404, program and software instruction storage 406, a wired input/output interface 407 for displays, keyboards and the like, an internal clock 408, and a network I/O interface 410, each coupled to a bus 412 for intercommunication. Network I/O interface 410 is in turn coupled to a network card 414, which includes its own circuitry such as an internal clock 416 and other components not shown. In some cases, the network card is not distinct and in some cases there might not even be much hardware associated with the networking function if it can be done by software instructions.

Program and software instruction storage 406 might comprise program code memory 420 and disk drive 422. Program instructions for implementing computing, communication, etc. functions, as well as network interfacing, can be stored in program code memory 420 and might be loaded in there from instructions stored on disk drive 422. Program code memory 420 might be just a portion of a common memory that also has memory 404 as a portion. For example, both memories might be allocated portions of RAM storage so that instructions and data used by programs are stored in one memory structure. With a general purpose, network-centric, signal processing-centric or other style of processor, functional modules that might be illustrated by blocks in a block diagram might be implemented entirely in software, embodied only in code stored in computer readable media. However, when executed as intended, the processor and the stored instructions perform the functions of those modules. For example, a device might be described as having a network stack that performs certain functions, but the network stack might not be represented in individual hardware elements.

Figure 5:
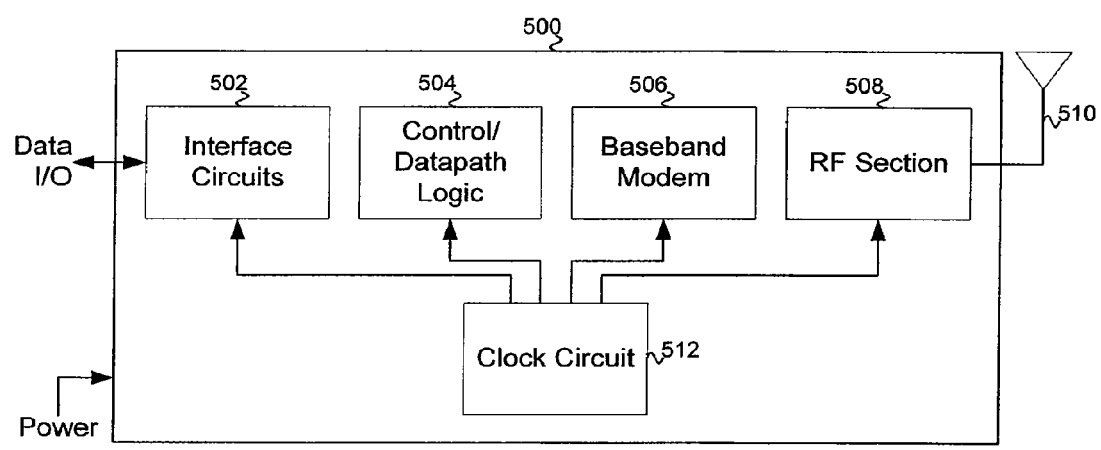
FIG. 5 is a block diagram of a network card that might be used to interface a COORD/dual-net device to the various networks.

FIG. 5 illustrates an example of a network card 500, shown comprising interface circuits 502 for interfacing network card 500 to a computing device (not shown), control/datapath logic 504, baseband modem circuitry 506, an RF section 508, an antenna 510 and a card clock circuit 512. Control/datapath logic 504 is configured to send and receive data to and from the computing device via interface circuits 502, send and receive data to and from baseband mode circuitry 506 and process that sent or received data as needed. Card clock circuit 512 might provide circuit clocking services as well as real-time clock signals to various other elements of network card 500. Note that logic elements shown and described might be implemented by dedicated logic, but might also be implemented by code executable by a processor. For example, some of the control/datapath logic's functionality may be implemented in software rather than hardware. An example processor is the ARM7 processor available from ARM Limited of London, England.

In operation of an example network card, power might be supplied via interface circuits 502 as well as providing a wired datapath for data into and out of the network card. Thus, when the connected computing device desires to send data over the network(s) supported by the network card, the computing device sends the data to an input circuit of interface circuits 502. The input circuit then conveys the data to control/datapath logic 504. Control/datapath logic 504 may format the data into packets if not already so formatted, determine the PHY layer parameters to use for the data, etc., and possibly other processes including some well-known in the art of networking that need not be described here in detail. For example, logic 504 might read a real-time clock from card clock circuit 512 and use that for data handling or include a real-time clock value in header data or other metadata.

Logic 504 then outputs signals representing the data to baseband modem circuitry 506 which generates a modulated baseband signal corresponding to the data. That modulated baseband signal is provided to RF section 508. The timing of output of signals of logic 504 and other parts of the network card might be dictated by a timing clock signal output by card clock circuit 512. RF section 508 can then be expected to output an RF, modulated signal to antenna 510. Such output should be in compliance with requirements of nodes of the networks with which the computing device is associating.

For example, if the computing device is expecting to be associated as a node in an 802.11b network, the signal sent to antenna 510 should be an 802.11b compliant signal. Also, the control/datapath processes should process data in compliance with the requirements of the 802.11b standard. Where the computing device is expecting to be a dual-net device, the signals sent should be compliant with the protocols and/or standards applicable for the network to which the signals are directed, and be done in such a way as to deal with the fact that while communication is happening among devices of one network (such as the primary wireless network or the secondary wireless network), those signals might be heard by devices that are only devices in a different network (such as the secondary wireless network, the primary wireless network or other network) and the signals should be such that devices can at least co-exist.

Where the computing device is a dual-net device, its network card would provide signals for the primary network and the secondary network. In one example mentioned herein, the primary network is an 802.11x network and the computing device is a STA node for that network and the secondary network is a PAN and the computing device is the COORD for that network. In some implementations, network communications are handled using a software platform that supports network applications.

In some embodiments, wherein 802.11x or other PWN protocols do not need to be supported, the built-in wireless circuitry or network card could be designed to handle only SWN protocols, as would be the case where the network comprises all devices that are capable of handling SWN protocol communications. Examples of such protocols include protocols that operate between devices built by H-Stream Wireless, Inc. to communicate using an H-Stream protocol such as their HSP protocol. In some HSP-enabled devices, the network logic can be entirely represented with software that accesses the RF section of a device that might be a generic network interface, possibly using additional hardware. However, where both ends are HSP-enabled devices, they might use their own hardware and control it at whatever level is needed for best performance.

Figure 6:
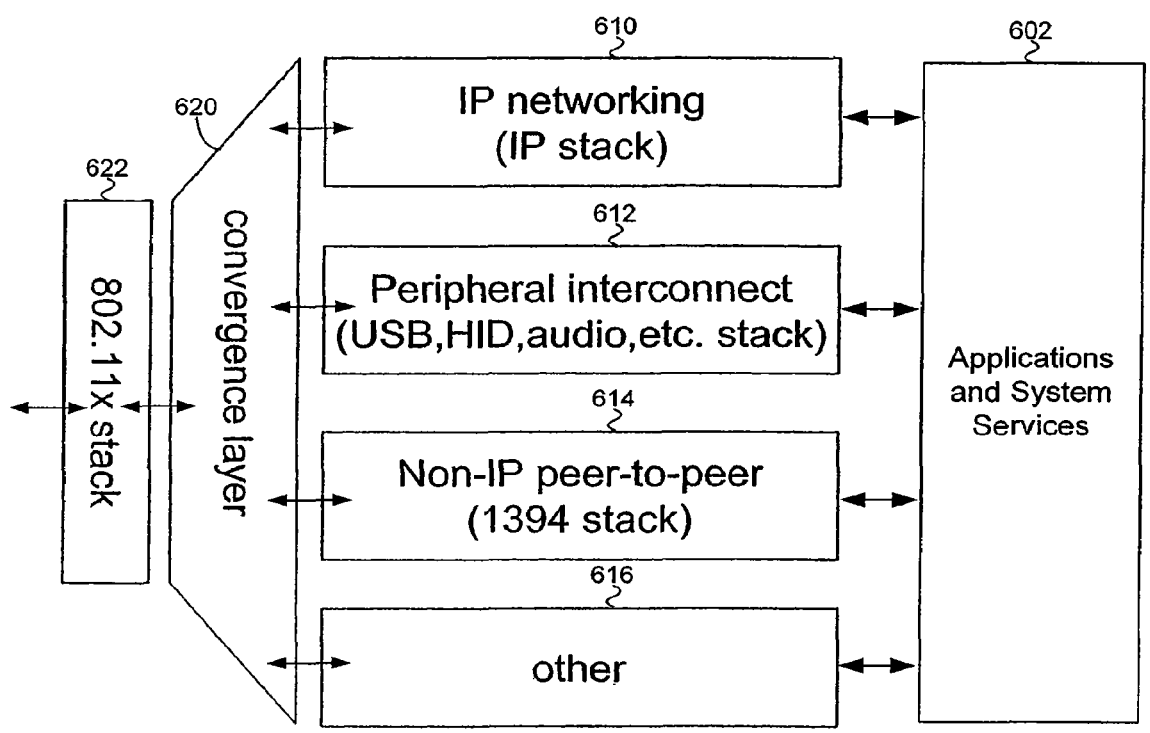
FIG. 6 is a block diagram of software components that might comprise software and/or logical constructs to interface applications with the networks supported by a COORD/dual-net device.

FIG. 6 illustrates a platform 600 as it might be present in a dual-net device, that represents software and/or logical constructs that together can be thought of as logical elements available for processing data within the computing device. As such, they need not be implemented as separate hardware components or distinct software components, so long as their functionality is available as needed. Other variations are possible, but in the layout shown, applications and system services (shown as block 602) are programmed to interface to various stacks, such as an IP networking stack 610 (sometimes referred to as an "IP stack"), a peripheral stack 612 (USB, HID, audio, etc.), a non-IP stack 614 (for IEEE 1394 interfacing) or other stack 616. For example, an application such as an HTTP browser might expect to communicate using TCP/IP and thus that application would have been configured to communicate with the computing device's IP stack.

A convergence platform can be added between an 802.11x stack and the different drivers to enable multi-protocol support, expose and coordinate access to specific MAC service primitives and coordinate the priority handling in Quality-of-Service (QoS) sensitive applications. This convergence platform can be a separate software layer or can also be integrated within the 802.11x stack.

For certain stacks, additional services may be required that might not be supported inside the 802.11x stack. If that is the case, such overlay protocol services may reside either inside the convergence layer or in between the convergence layer and the respective stack. As an example, communication with peripherals may require protocol services in addition to the protocol services provided by the 802.11x stack in order to meet the power and latency requirement typical of such applications. Such protocol services may be part of the convergence layer, or may reside in between the convergence layer and the Peripheral Interconnect Stack. Of course, as an alternative, the 802.11x stack may have been adapted to support such services.

Each of the stacks 610-616 is shown coupled to a convergence layer 620, which provides the necessary and/or optional conversions of data, protocol, timing, etc. so that each of the higher level stacks 610-616 are interfaced to an 802.11x stack 622. 802.11x stack 622 can then interface to the computing device's network card (or other network circuitry). In this manner, for example, stack 622 might handle a browser's traffic that goes through IP stack 610 while also handling a mouse interface whose traffic goes through peripheral stack 612. Note that with a single 802.11x stack, a single network interface can carry traffic for more than one higher-level stack. The single network interface needs to be tuned to deal with the different requirements of the different stacks.

Communication protocols can be implemented with drivers or firmware that is installed on the dual-net device/COORD. The drivers or firmware might comprise an 802.11x peripheral service function (e.g., for implementing the services of the overlay protocol that are not supported inside the 802.11x stack), which can be application-independent, and an adapter driver to connect the 802.11x stack and 802.11x peripheral service function to the appropriate driver inside the dual-net device/COORD platform. The adapter driver may be device class or device specific.

Figure 7:
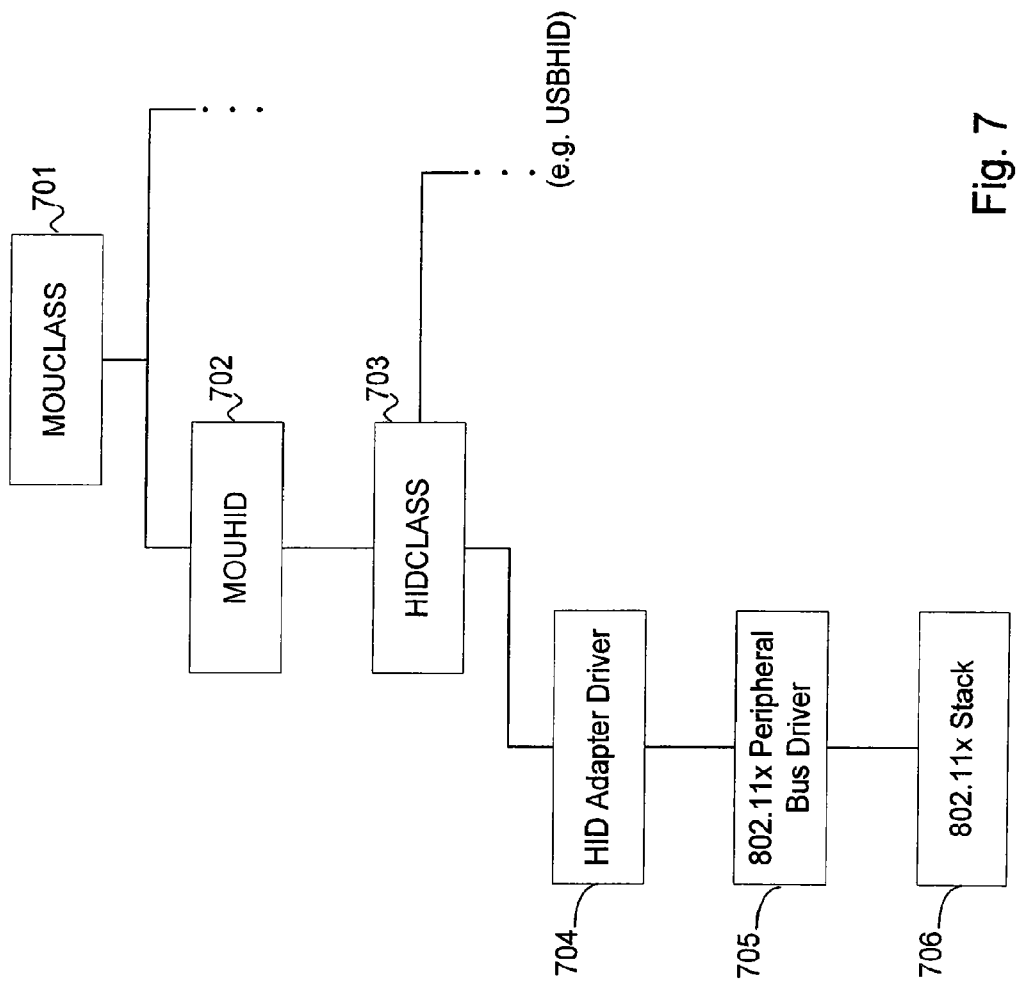
FIG. 7 is a block diagram of classes and objects that might be used in an interface between a network and applications.

An example of this is illustrated in FIG. 7 for a wireless PAN where a mouse is connected over the WM to the standard HID class driver in a PC running on the Windows (or other applicable Operating System (OS)). The driver or firmware resides between the 802.11x stack 706 and the standard HID class driver 703. In a specific implementation, the driver or firmware can constitute an HID adapter driver 704 and an 802.11x peripheral bus driver 705.

Other variations of what is shown in FIG. 7 are possible. For example, the 802.11x peripheral service function might connect up to the MOUHID driver 702 directly. In that case, the HID adapter driver is written as an HIDCLASS miniport driver. This driver then layers under the MOUHID 702 and MOUCLASS 701 drivers and allows mouse data to be injected into the operating system.

Alternatively, the adapter driver may connect to the USB stack instead. The adapter driver may, for example, be written as a virtual USB bus driver and connect up to the standard USB stack available as part of the operating system or operating system modifications. Depending on the specific implementation, the adapter driver may connect at different layers into the USB stack.

In specific embodiments, the 802.11x peripheral service function and adapter driver may be combined in a single driver. Alternatively, two separate drivers may be used and a private interface might be defined and used between both drivers.

The adapter driver receives the 802.11x frames from the 802.11x peripheral service function that are intended for the higher layer driver (e.g., MOUCLASS driver). Similarly, the adapter driver receives frames from the higher layer driver that are to be transmitted to a PER using the 802.11x circuitry. The adapter driver and 802.11x peripheral service function generate and decode the necessary packet header for running a specific application, like the HID protocol, over an 802.11x data channel. For example, it removes the 802.11x-specific MAC header and performs the necessary manipulation to transform it in the correct format to be passed on to the respective class driver.

Figure 8:
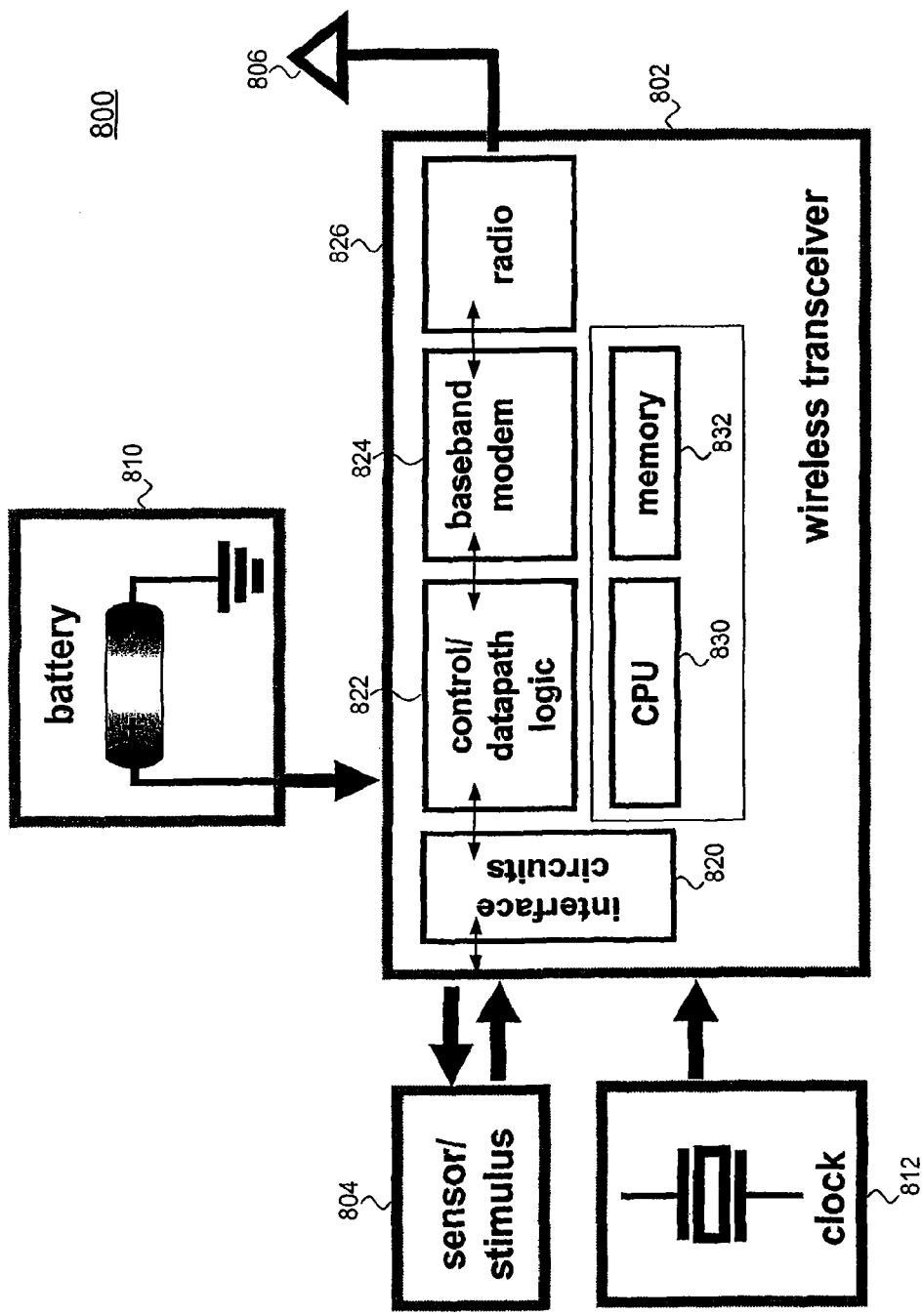
FIG. 8 is a block diagram of an example of a PER device.

FIG. 8 is a block diagram illustrating an example of what might be the components of a PER device. As shown, PER 800 comprises a wireless transceiver 802 coupled to sensor/stimulus elements 804 and antenna 806. Additional components, such as a filter, a balun, capacitors, inductors, etc., may be present between wireless transceiver 802 and other elements. Generally, wireless transceiver 802 allows other networked devices to understand results of sensing (in the case of a PER that does sensing, such as a mouse, microphone, remote condition sensor, etc.) and/or to specify stimulus (in the case of a PER that outputs visual, audio, tactile, etc. outputs, such as a printer, headset, etc.). It should be understood from this disclosure that PER can be a wireless input and/or output device and in many cases, the wireless transceiver can be designed independent of the particular input and/or output.

FIG. 8 also shows a battery 810 and a clock circuit 812. Battery 810 provides power for wireless transceiver 802 and elements 804 as needed. As weight and portability are likely to be important in the design of the PER, battery consumption will often have to be minimized for a good design. Clock circuit 812 might provide real-time clock signals as well as providing circuit timing clock signals.

As shown, wireless transceiver 802 comprises interface circuits 820, control/datapath logic 822, a baseband modem 824, and an RF section 826. Control/datapath logic 822 might be implemented with circuitry that includes a central processing unit (CPU) 830 and memory 832 for holding CPU instructions and variable storage for programs executed by CPU 830 to implement the control/datapath logic. Control/datapath logic 822 might include dedicated logic wherein CPU 24 and memory module 25 implement the portion of the communication protocol that is not implemented in the dedicated control and datapath logic. The CPU instructions might include digital signal processing (DSP) code and other program code. The other program code might implement MAC layer protocols and higher-level network protocols.

Clock circuit 812 might include a crystal oscillator. Clock circuit 812 might be aligned with clocks in other network devices, but the clocks may drift over time relative to each other.

Although not shown, other components like capacitors, resistors, inductors, filters, a balun, a Transmit/Receive (T/R) switch, an external power amplifier (PA) and an external low-noise amplifier (LNA) may also be included in PER 800.

Wireless transceiver 802 might be configured so as to communicate over the physical layer (PHY) of a standard IEEE 802.11-compliant circuit chip. Wireless transceiver 802 may be an embedded System-on-Chip (SoC) or may comprise multiple devices as long as such devices, when combined, implement the functionality described in FIG. 8. Other functionality, in addition to the functionality of FIG. 8 may also be included. Wireless transceiver 802 might have the ability to operate, for example, in the unlicensed 2.4-GHz and/or 5-GHz frequency bands.

One or more of the techniques described below might be needed to deal with the characteristics of a wireless PAN that differ from a WLAN, or just to improve performance of the devices in the networks. Modifications that create an overlay protocol, herein referred to as the PER service function, are described or suggested herein. In some cases, a computing device is able to join the WLAN and the wireless PAN (and even at the same time), while in other cases, a computing device is only able to join the wireless PAN. In either case, the same or a similar overlay protocol might be used to obtain the benefits thereof. Where the computing device is able to join both, the overlay protocol is preferably such that the same networking hardware can be used for the computing device to join both networks.

WM Reservation

Power conservation may tend to be more critical in a PER device than in a COORD device. One technique described herein for conserving power inside a PER device is to use lower transmit power and relax the range requirements for a transmitter below that which would be acceptable for an 802.11x transmission. This reduces the reception range of the PER's signal, but in most cases, the COORD is close enough to the PER to get the signal and this is not an issue.

If the transmission and receive range of one or more members of a SWN are reduced to conserve power, frames transmitted by the PER might not be detectable by members of the PWN and communication among members of the PWN might not be detected by the PER. This can lead to interference between both networks, especially if both networks operate in the same frequency band and on the same channel. This can be addressed by using different frequency bands or channels, but can also be dealt with using a common band or set of bands and a common channel or set of channels. One such coordination method comprises a novel WM access procedure where a powerful STA, like the dual-net device, reserves the WM for a low power node, like the PER. The WM reservation would be heard by devices in a primary network that could not be reached by the PER.

In a specific embodiment, a COORD might determine a length of time for communication with a PER, transmit an 802.11x frame with the proper fields (e.g., duration value) set so as to reserve the WM for at least that amount of time, and listen for a response frame from respective PER. The frame transmitted by the COORD might be an actual 802.11x frame or a modification thereof. In any case, the frame arrangement shall be such that STAs in nearby WLANs upon reception of such frame from COORD defer access to the WM for at least the length of time specified by the frame. In addition, the frame arrangement is such that it can be successfully received by a PER. A PER, upon reception of such frame can respond with a response frame immediately or after a specified turn around time. In any case, a PER can respond without requiring a separate WM arbitration or WM reservation. As long as the length of the response frame does not exceed the length of the WM reservation made by the COORD, this communication can happen without interference from a nearby WLAN, independent of whether or not the PER is able to reach the primary network WLAN devices.

In a slightly different embodiment, a dual-net device might determine a time and a length of time for communication with PER devices in its SWN, signal to the PWN using the PWN (WLAN) protocol such time and length of time, and communicate with PER devices during the periods of time agreed upon with the PWN. The signalling to the PWN can occur once prior to or at the start of a series of SWN communication events. As an example, if the SWN communication events are periodic, the dual-net device and PWN devices may at one point in time agree on a start time and recurrence period for WSN communication events. Alternatively, the signalling to the PWN might occur prior to or at the start of each WSN communication event. Variations are also possible, where specific portions of the signalling to the PWN occur at the start or prior to the start of a series of communication events, whereas additional signalling is done at or prior to the start of each WSN communication event.

In the example where the PWN is an 802.11x WLAN network, signalling of SWN communication events to the PWN can be done by using features and functionality that are supported by the 802.11x WLAN protocol, yet use such features and functionality in a different arrangement and for a different purpose, that is to accommodate reliable communication in a coexisting power-sensitive secondary wireless network.

As an example, the 802.11(e) WLAN protocol supports a channel access mechanism, called Hybrid coordination function Controlled Channel Access or "HCCA" that allows an AP in an 802.11 WLAN to coordinate contention free media use and allows the scheduling of WLAN traffic, as is desirable for high Quality-of-Service ("QoS") applications. HCCA is a polling-based mechanism, where a STA can set up a Traffic Stream ("TS") with the AP of its BSS.

As part of the TS set-up, polling times and polling intervals are negotiated and agreed upon between the AP and the STA. The AP can access the medium in a prioritized manner with respect to other STAs using basic access mechanisms, and as such has more control over the use of the WM. Once the AP has taken control of the WM, it can poll the STA at the agreed upon time and grant the STA a transmission opportunity ("TXOP") by making an adequate WM reservation for communication with the STA. The HCCA mechanism might be used by a dual-net device to set up a TS with the AP of its PWN. It can then make use of the TXOPs and related WM reservations granted by the AP to communicate with PER devices in its SWN. The dual-net device can communicate the QoS requirements of the attached PER to the AP (e.g., during a TS set up), "pretending" it to be requirements for itself. However, when granted the TXOPs by the AP it can use these to conduct polling of and communication with devices in its SWN and as such meet the QoS requirements of the PER devices in its SWN.

In certain embodiments, it may be desirable to only reserve the wireless medium in a limited radius around the SWN network to allow other devices to communicate or operate without concern over the reservation. This may be desirable to increase the capacity of the wireless medium. To achieve this, the COORD or dual-net device reserves the WM by transmitting a frame at a reduced transmission power, compared to the transmission power it normally uses for communication within the PWN. As an example, by reducing the transmission power for the WM reservation frame from 20 dBm to 0 dBm, the range over which the WM will be reserved is typically reduced from hundreds of feet to tens of feet. This is illustrated in FIG. 9.

Figure 9:
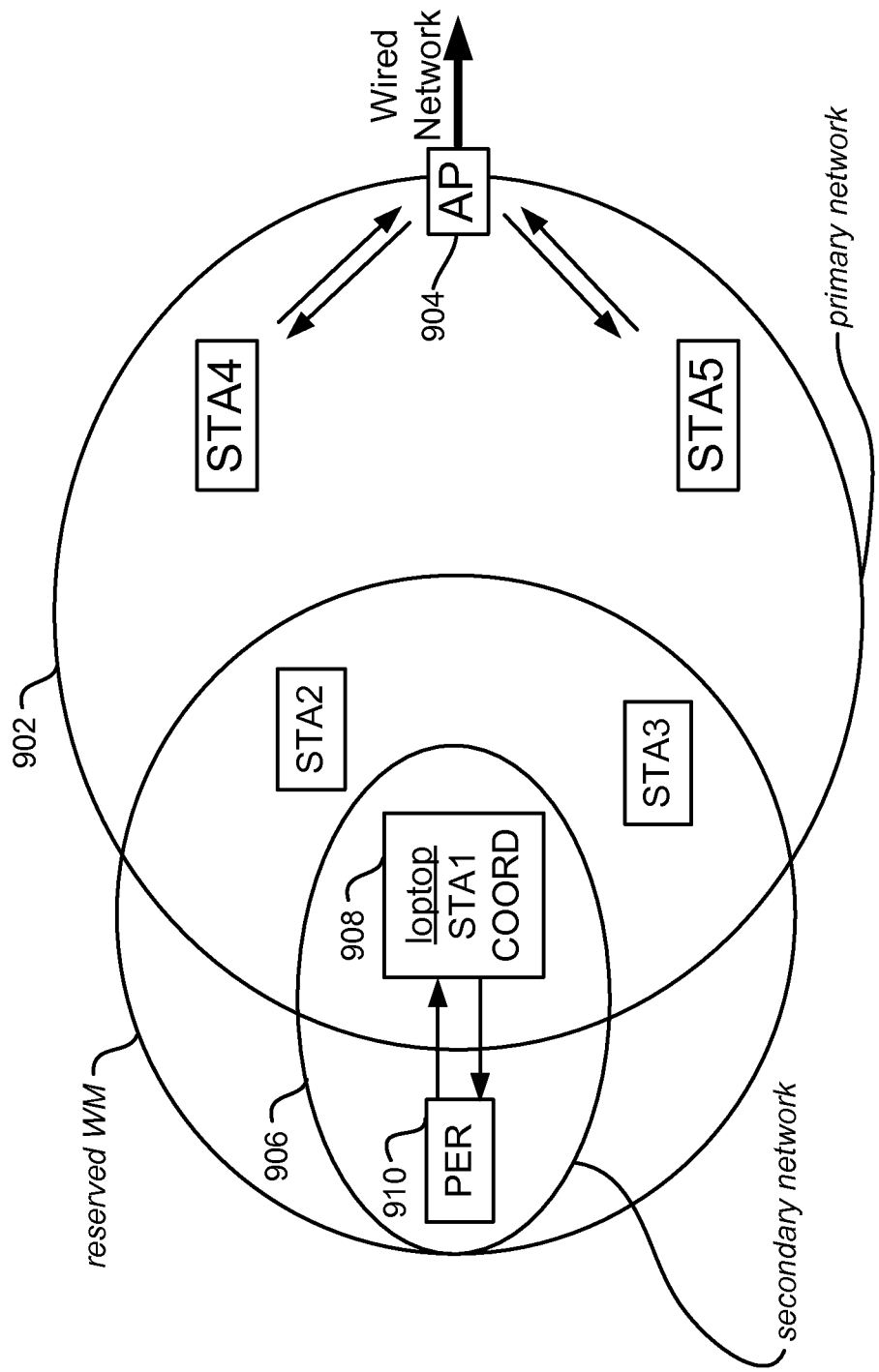
FIG. 9 is a diagram illustrating a reduced wireless medium reservation zone relative to two network spaces.

FIG. 9 illustrates wireless networks wherein a primary network 902 is coordinated by an AP 904. Five STA devices (STA1 through STA5) are shown within primary network 902. A secondary network 906 is shown, wherein a laptop 908 is a dual-net device, in that it acts as a COORD for secondary network 906 and as a station STA1 in primary network 902.

PER 910 is within secondary network 906. Laptop 908 issues a reduced power WM reservation (or PER 910 does), to alert devices within range 912. In the example shown, STA2 and STA3 hear the reservation and defer, but STA4 and STA5 do not fall within the reservation range of COORD 908. Thus, STA4 and STA5 can continue to communicate with AP 904 in primary network 902. In such a configuration, secondary network 906 takes less capacity away from primary network 902. If the transmission range of a PER is reduced to conserve power, this approach can be implemented without causing significant interference between the secondary network and far-away STAs in the primary network.

With only a "local" reservation of the WM, it is very well possible that the AP does not detect that reservation and may try to send a frame to the COORD, since it is a STA on the PWN. The odds of that happening are pretty low though, since the COORD is only communicating with a PER for a very short time. If this collision happens, the AP will not get an ACK and will resend at a later time.

To increase the capacity of the common wireless medium, a novel method can be applied, where a COORD in a SWN adjusts the range over which it reserves the WM based on activity in the PWN or activity in separate nearby SWNs. As an example, if a lot of traffic is detected, a COORD might decide to reduce the transmission power for signalling to the PWN, so that fewer devices in nearby wireless networks are affected by the WM reservation. If the COORD is a dual-net device, it may communicate with the AP of its PWN to receive information about current WM activity, bandwidth usage, desirable transmission powers and WM reservation ranges etc.

Synchronization and Traffic Scheduling

Another technique for conserving power is to power off a portion or all of the circuitry in one or both of the PER and COORD during quiescent times, preferably coordinating a wake-up time so that the devices can check in with each other, to find pending data, synchronize clocks, etc. In many wireless PAN applications, it is important to minimize the power usage not only inside the PER but also inside the COORD. This is typically the case when the COORD is also a battery-operated device. An example of such wireless PAN is the attachment of a wireless peripheral to a laptop. Another example is the attachment of a headset to a mobile phone or PDA. It is important to minimize the power usage inside the laptop, mobile phone or PDA, since that determines how long such device can be used before a recharge is needed.

802.11x WLAN network power saving techniques are typically found only in the STA devices, as most access points are wired for electricity and data. For example, in the BSS shown in FIGS. 1-2, power saving techniques might be implemented inside the STAs but the AP stays awake all the time. A novel method comprises a synchronization procedure wherein a frame exchange sequence occurs between the COORD and the PER, in combination with a scheduling method to coordinate traffic between a PER and its COORD. In specific embodiments, a COORD communicates to a PER timing information of its local timer as well as information about times of desired communication with the PER referenced to its local timer. A PER, upon reception of such information can synchronize its timer to the timer of the COORD and based on the information received from its COORD can determine at what time a communication event with its COORD is scheduled to take place. The start of a scheduled communication event is herein also referred to as the start of a Service Period. In between communication events, both the COORD and PER can power down a portion or all of their circuitry to conserve power. At the start of a scheduled communication event, or slightly before the start of a scheduled communication event, both the COORD and PER power up the necessary circuitry and exchange frames using an overlay protocol that avoids interference with PWN STAs that might coexist in the same wireless networking space. With synchronization and scheduling, power saving can occur at both ends of the link.

When the COORD is a dual-net device (i.e., it is also a STA in a PWN) and that dual-net device is in power-save mode in its primary network, it is critical that the appropriate circuits be powered up in time for communication with the PER, in order to ensure reliable communication and accurate timing of frame transmissions. Traditionally, when a STA receives a wake-up request, the STA powers up, and an empty data frame with the power management bit cleared is sent to the AP, to notify the AP of the change in its power save mode. Where the STA is a COORD and the wake-up request is triggered by the secondary network, there is no need to notify the primary network's AP of a change in power-save mode.

This "pseudo-power-save mode", where the necessary circuits are powered up to transmit and receive data but the AP of the primary network is not notified of a change in power-save mode has the advantage that the AP will not attempt to send any pending traffic for that STA. Ideally, the dual-net device's circuits are powered on and off in synchronization with the PER medium access times. Whether it is possible to power down the dual-net device's circuits in between data exchanges depends on the hardware and firmware implementation of the IEEE802.11 MAC and PHY, and the duration of the pre-negotiated communication intervals.

It is possible that a COORD or dual-net device cannot get access to the WM for extended periods of time because of traffic on the PWN. This can introduce latency problems and may result in additional power consumption as the PD may be kept awake waiting for extended periods of time for the WM to become idle. If the COORD is a dual-net device it can communicate with the AP of the PWN, retrieve information from AP related to scheduled traffic streams and other forms of AP or STA activity so as to be able to track the activity on the PWN, and arrange the communication events with devices in its SWN when the PWN is expected to be idle. As an example, if the PWN is an 802.11(e) network, a dual-net device may inquire information about the AP's Controlled Access Phase (CAP) and schedule communication events with PERs in its SWN so as to avoid the AP's CAP.

Frame Sequences

In a specific embodiment, a COORD and PER communicate at mutually agreed upon time intervals, herein referred to as Service Intervals. A Service Interval ("SI") is defined herein as the interval between the start of two successive service periods ("SPs"). A service period (SP) is defined herein as a contiguous time during which one or more attempts is made to communicate one or more messages from a master device to a slave device and/or a slave device to a master. In general, it is expected that during an SP, both devices are attempting to communicate with each other by either transmitting a packet or listening for a packet to be transmitted by the other device. It is possible that there are small inactivity times in between packet exchanges, but such inactivity times are typically significantly shorter than the SI. The service interval may be a constant value or can be irregular from service period to service period. A service period may always be a fixed length or may vary from service period to service period. As an example, a master device and a slave device may have to agree on timing so that they can power down some or all of their circuitry between SPs. In that case, the master and slave device preferably ensure that they power up the necessary circuits at, or slightly prior to, the start of an SP.

The start of a Service Interval ("SI") is established, mutually agreed upon and adopted by both the COORD and PER as part of a synchronization and traffic scheduling method that is part of the wireless PAN overlay protocol. With synchronization and traffic scheduling, power saving can occur at both ends of the link. The period of time during which frames are exchanged is hereafter referred to as the Service Period (or "SP").

Figure 10:
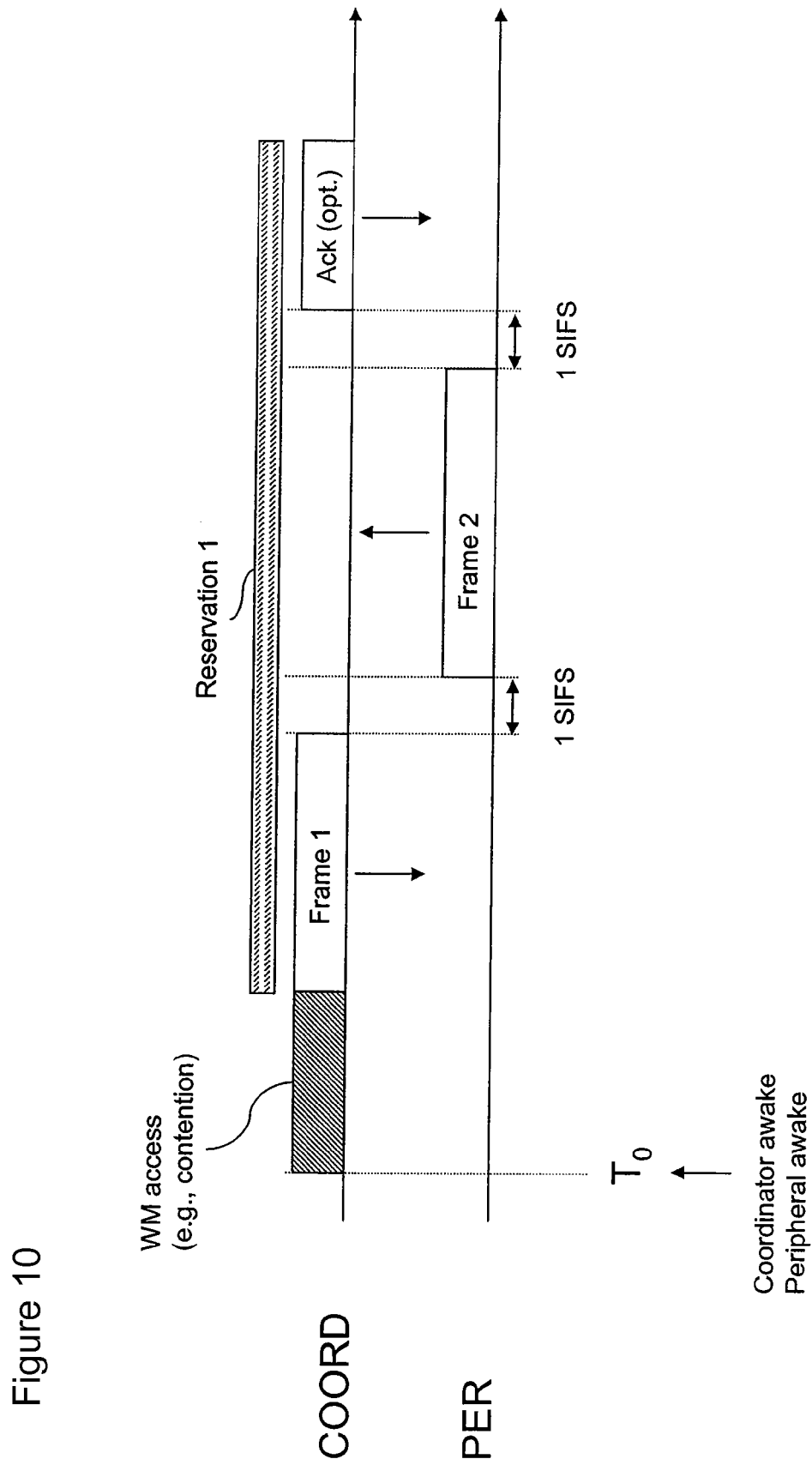
FIG. 10 is a timing diagram illustrating timing for a frame exchange process.

The frame exchange is illustrated in FIG. 10. As shown there, at the start of an SP, T0, the COORD and PER are programmed to start the frame exchange. If power-save modes are implemented in the COORD or the PER, a wake-up request will be issued prior to T0, to ensure that all necessary circuits are powered up at time T0. At time T0, the COORD gains access to the WM. Access to the WM can be obtained through various methods including but not limited to WM contention, a priority access scheme (e.g., if the WM is detected to be busy, the COORD waits for a length of time, but this length of time is shorter than the amount of time other devices have to wait) or a scheduled access scheme where slots of time are pre-allocated such that no contention is required.

It is also possible that a different device, such as for example the AP of the COORD's PWN gains access to the WM using basic contention or a prioritized access scheme and grants a transmission opportunity or "TXOP" to the COORD, which the COORD can then use to communicate with PERs in its SWN. In any case and independent of what access mechanism is used, upon gaining access to the WM, the COORD transmits a first frame (Frame 1), hereafter referred to as a "downlink frame". If the COORD uses WM contention to gain access to the WM, the downlink frame may be transmitted using priority queues available inside the COORD. For example, the downlink frame may be transmitted using the highest priority queue. The highest priority queue might be the priority of VoIP packets (e.g., AC_VO), but in some cases it might not be necessary, not be convenient or not be possible to use the highest priority queue.

The frame format of the downlink frame is such that it reserves the WM for the subsequent frame transmission by the PER. As an example, if the downlink frame is an 802.11x frame or a modification thereof, the duration field in its header might have been increased to reserve the WM for at least the subsequent frame transmission by the PER. The frame transmitted by the PER (frame 2) is hereafter referred to as the "uplink frame". The sequence of FIG. 10 assumes that the COORD has sufficient information to determine an appropriate WM reservation for the subsequent uplink frame. As an example, the COORD and PER may have exchanged information about a typical uplink frame length (e.g., data size) during an earlier communication. In addition, COORD and PER are aware of the other and have knowledge of critical communication information such as each other MAC addresses; encryption keys and the like. Such critical communication information may have been exchanged during an earlier communication.

In case of data traffic from the COORD to the PER hereafter referred to as "downlink data" (e.g., headset application), or in case additional information (e.g., management or control information) needs to be communicated to the PER, such data and/or information may also be included in the downlink frame.

A pre-defined time later, such as one short interface space ("SIFS") later, the PER responds with an uplink frame containing the data and/or additional information (e.g., management and/or control information) from the PER. Optionally, the COORD can acknowledge reception of the uplink frame, which can be one SIFS later. Alternatively, regular medium access procedures (e.g., contention) may be followed to transmit the ACK, or the ACK may be included with communication in the next SP. The ACK may be a frame in an 802.11x ACK frame format, or a different format, as defined by the wireless PAN overlay protocol.

The duration of the WM need not be fixed and can vary. For example, the time to send ACK may, may not or may partially be included. Other variations may also be possible. The WM reservation is preferably sufficient to allow a protected transmission of the uplink frame by the PER device without requiring a contention for the WM by the PER device.

If no downlink data/information is included with the downlink frame (e.g., because the downlink frame format does not allow for inclusion of data/information), and downlink data/information is present inside the COORD, the sequence of FIG. 10 may be modified wherein the COORD can optionally send an additional frame with data/information after transmission of the first downlink frame, or following the reception of an uplink frame. The first downlink frame may reserve the WM for the entire duration of the frame exchange, or at least for a portion of the frame exchange to allow a protected transmission of the uplink frame by a PER device, and without requiring a contention for the WM by the PER device. Optionally, the PER can acknowledge error free reception of that frame.

Variations are possible, but in any case, the poll frame reserves the medium for subsequent frames such that frame exchange can happen with a single medium contention; and frames transmitted by PER are protected by medium reservation by COORD. For example, the COORD might send a downlink frame to PER1, send a downlink frame to PER2, and receive an uplink frame, all within one medium reservation.

Figure 11:
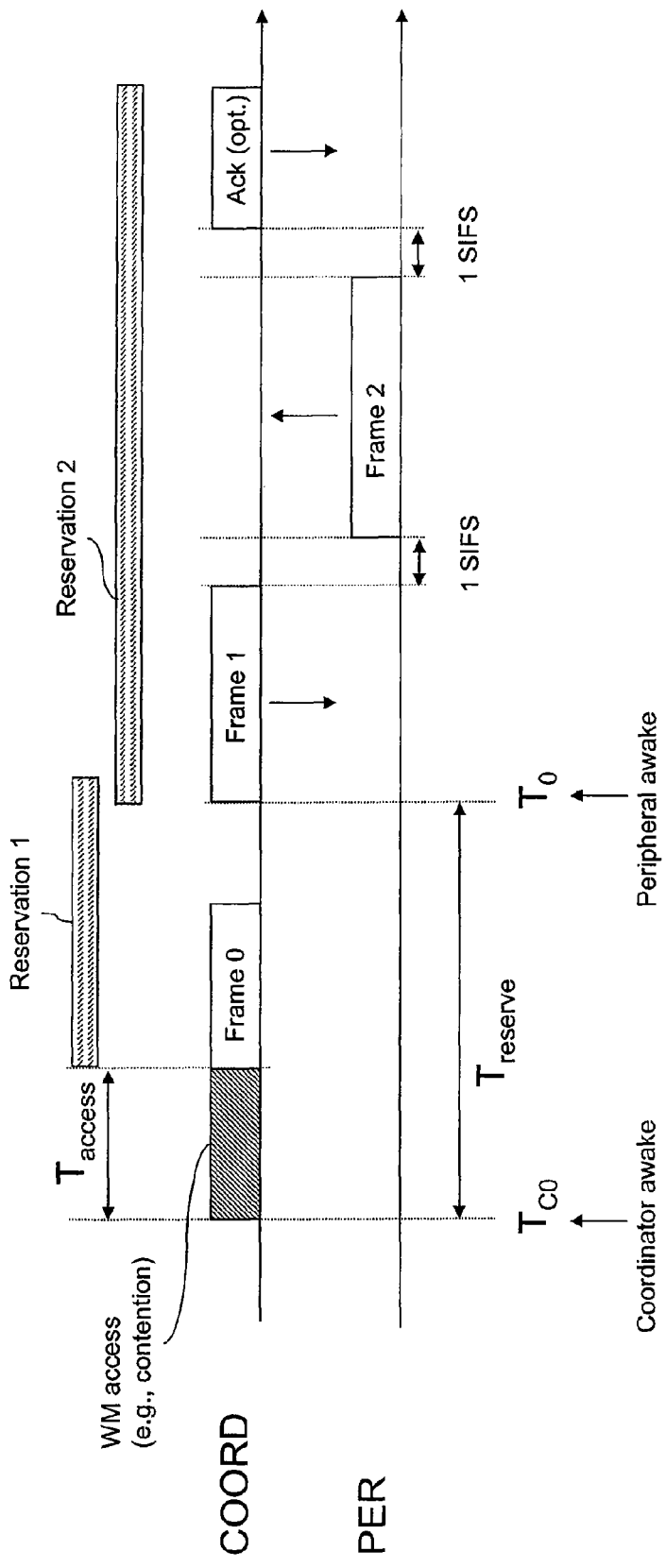
FIG. 11 is a timing diagram illustrating timing for an alternative frame exchange process.

An alternative frame exchange sequence is illustrated in FIG. 11. The method disclosed in FIG. 11 avoids situations where another STA accesses the WM right before the scheduled data exchange between COORD and PER. This method can be used to minimize the power dissipation in the PER and improve the Quality-of-Service (QoS) of the COORD-to-PER communication link. To prevent other STAs from accessing the WM in a time period Treserve prior to the start of the scheduled data exchange, the COORD is awake prior to T0 and transmits a frame (frame 0), hereafter referred to as a "reservation frame" to reserve the WM.

At time TC0, a time Treserve prior to T0, the COORD gains access to the WM, either through contention or through a different medium access mechanism, and transmits a first frame (frame 0), herein referred to as the "reservation frame". The frame arrangement of the reservation frame is such that the WM is reserved for a length of time equal or larger than (Treserve−Taccess), where Taccess is the time needed to gain access to the WM. In this way, no other STAs can transmit during the time between frame 0 has been transmitted and the start of the scheduled data exchange, T0. As an example, if the reservation frame is an 802.11x frame or a modification thereof, the duration field in the header of the reservation field may be increased to reserve the WM for at least the length of time specified above. At time T0, the COORD immediately sends its first frame (frame 1) without having to gain access to the WM again. The further frame exchange can be the same as that of FIG. 10. The above described method minimizes the awake time for the PER, and improves QoS, at the cost of somewhat longer WM occupancy. Variations are also possible. As an example, in a slightly different embodiment, the reservation frame might reserve the WM for a longer length of time, thereby possibly eliminating the need for the downlink frame to reserve the WM.

If at time T0, the COORD has not gained access to the WM or has not yet transmitted frame 0, the COORD may decide to fall back to the frame exchange sequence described in FIG. 10. In such embodiment, the COORD continues to gain access to the WM (e.g., through contention) after time T0. Once the COORD has successfully gained access to the WM, it might decide to skip the transmission of the reservation frame, frame 0, and directly transmit the downlink frame, frame 1.

In the frame exchange sequences described above, the COORD reserves the WM for the PER to avoid interference between a PWN and SWN. If the transmission power of the secondary network is sufficiently low, a WM reservation mechanism may not be necessary. In such embodiments, a PER can wake up and can directly access the WM, without waiting for a signal from the COORD. Optionally, a PER may wake up, detect whether the WM is idle and if not, contend for the WM prior to initiating a transmission. As an example, upon detection of a non-idle WM, the PER can follow a random back-off procedure before attempting to access the WM. Alternatively, for power conservation reasons, upon detection of a non-idle WM, a PER may power down at least part of its circuitry and wake up a time later to try to access the WM again. A PER could go back to sleep for a pseudo-random period, which would result in the equivalent of a semi-random back-off, but while conserving power inside the PER.

Optionally, a PER may rely on RSSI circuitry (an only wake up circuitry necessary for RSSI) to detect whether the WM is idle and only wake up the necessary circuitry for transmission after the WM has been detected to be idle. If the transmission power of the PER is sufficiently low, communication in the secondary network will not cause any significant interference to simultaneous traffic in the primary network. However, traffic in the primary network can cause transmission failures in the secondary network. If this happens, a retry mechanism can be initiated, at the expense of some additional power usage.

Other variations of frame sequences are also possible. As an example, in case the HCCA mechanism is used to reserve the WM, the frame exchange between the COORD and PER may be preceded by a poll frame transmitted by the AP of the dual-net device to grant a PWN TXOP to the dual-net device and the SWN traffic (downlink, uplink, etc.) that fits can be send using the TXOP provided by the AP.

Coordination of Multiple PERs

When a SWN includes multiple PERs as illustrated in FIG. 1 and described herein, communication with such devices can be scheduled independently. However, in specific implementations, it may be desirable for a COORD to coordinate the communication with multiple PERs that are part of the same SWN in order to minimize the power dissipation, as well as to possibly reduce the WM occupancy. A method to coordinate the communication between a COORD and multiple PERs is shown in FIG. 12, and is an extension of the scheme of FIG. 10 to account for communication with more than one PER during a single SP.

At time T0, the COORD and PERs of a SWN (wireless PAN) are programmed to start the frame exchange. If power-save modes are implemented in the COORD or the PERs, a wake-up request will be issued prior to T0, to ensure that all necessary circuits are powered up at time T0. At time T0, the COORD tries to gain access to the WM and, optionally using the highest priority queue (AC_VO) transmits a first frame (frame 1), the downlink frame. Note that different mechanisms to access the WM may also be used. The frame format of the downlink frame is such that it reserves the WM for the subsequent frame transmission possibly by more than one PER in its SWN. As an example, if the downlink frame is an 802.11x frame or a modification thereof, the duration field in its header might be increased to reserve the WM for subsequent frame transmissions by one or multiple PERs that are part of the COORD's SWN. The duration field of this frame might for example be increased to reserve the WM for subsequent frame transmission by all PERs of the SWN that are scheduled for a frame exchange during that specific SP.

Furthermore, the downlink frame contains a list of PERs it expects to respond, as well as an offset for each scheduled PER. As an example, this information can be included in a Traffic Indication Map (TIM) that is part of the downlink frame arrangement, but other implementations are also possible At the specified offset, each PER is awake and responds with a frame, an uplink frame, containing its data (frame 2P1 and frame 2P2). Optionally, the COORD acknowledges error free reception of the frame, or the COORD can respond with a frame that includes data to be transmitted from the COORD to the frame. Optionally, the PER acknowledges error free reception of the latter frame. Optionally, PERs can return to sleep during the time slots where the COORD is communicating with other PERs.

Figure 12:
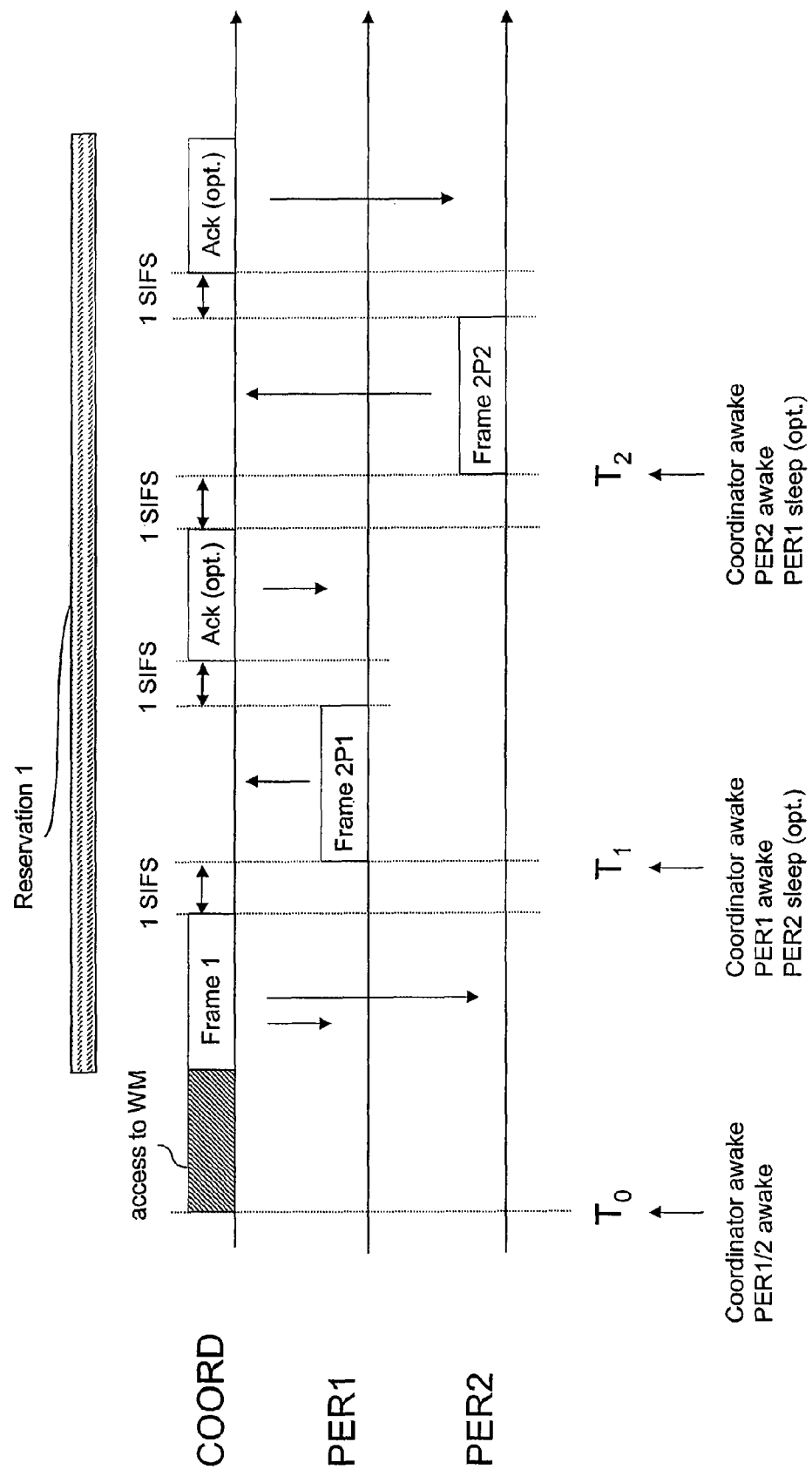
FIG. 12 is a timing diagram illustrating timing for a multi-PER coordination process.

Modified versions of the scheme of FIG. 12 can be used to compensate for packet loss and unsuccessful transmissions. As an example, if one or more of the transmissions were not successful, the COORD may send an additional frame immediately following the above described frame sequence to reserve the WM for additional time to allow for retransmissions. This frame contains the PERs for which retransmission is desirable as well as the corresponding offsets for each PER. PERs that received acknowledgment of their transmission do not have to wake up to listen to this additional frame. In one embodiment, it may be left up to a PER to decide whether it will consider retransmission.

If the PWN is an 802.11(n) network, a Power Save Multi Poll ("PSMP") frame or a modification thereof may be used as the downlink frame, but other frame formats are also possible.

Figure 13:
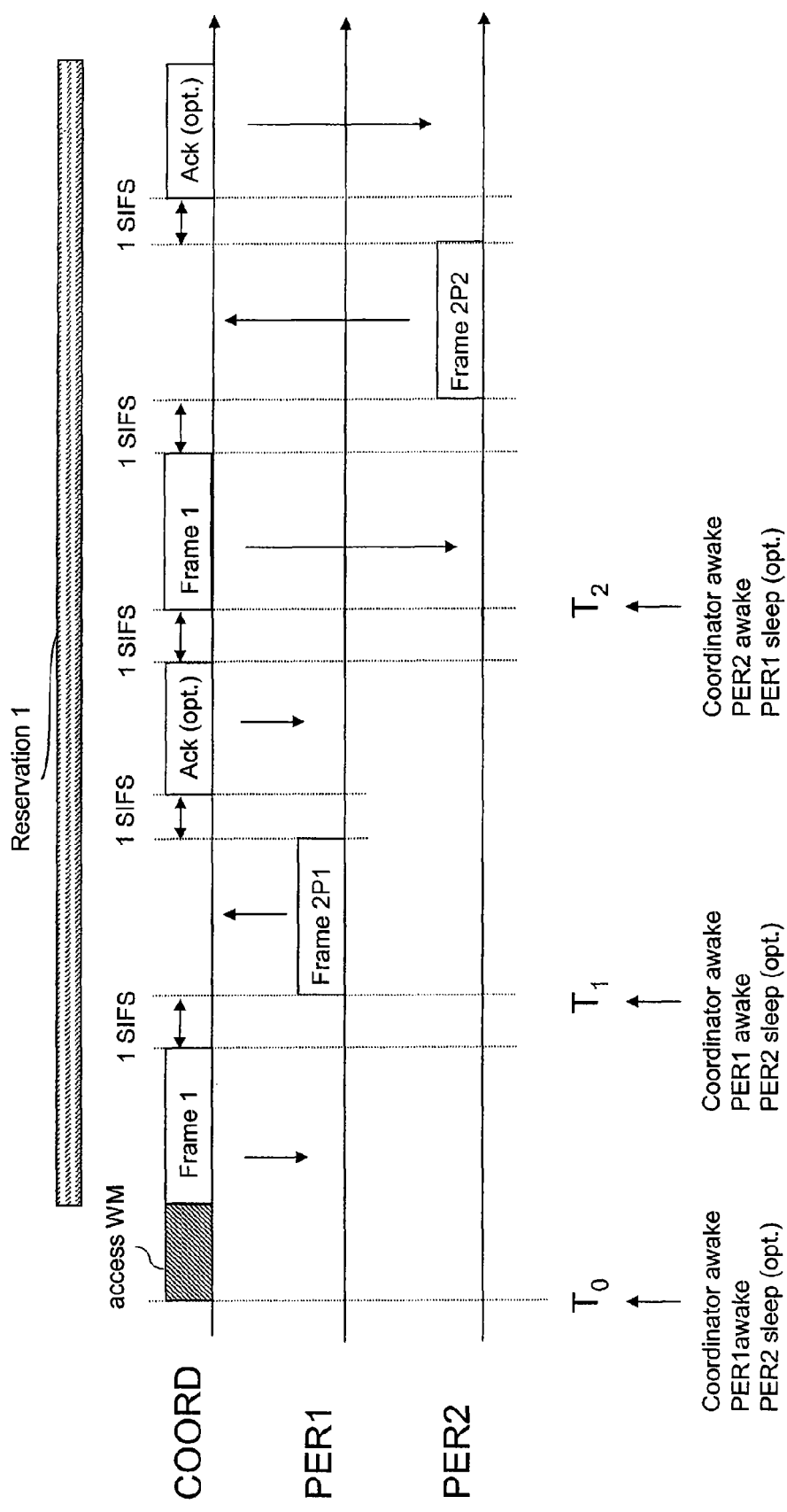
FIG. 13 is a timing diagram illustrating timing for an alternative frame exchange sequence for a multi-PER coordination process.

An alternative frame exchange sequence for the coordination of multiple PERs is illustrated in FIG. 13. In this embodiment, the COORD polls each PER individually. At the start of a Service Period ("SP"), the COORD accesses the medium using regular medium access procedures (e.g., contention) and after gaining access to the WM, the COORD polls the PERs in its SWN one by one with 1 SIFS space intervals. This is possible if the first downlink frame ("Frame 1") reserves the WM for the subsequent frame sequence. The latter avoids the situation where the COORD has to contend for the WM for each PER in its secondary network.

To conserve power in the PERs, the expected time for communication with each PER can be pre-calculated based on the number of PERs that are scheduled to be polled prior to the respective PER and their scheduled traffic size.

In case a transmission fails, a retransmission mechanism can be initiated. Alternatively, the COORD may poll the next PER and come back to the failed transmission later, after it has polled all other PERs for which a communication event is scheduled during that specific SP.

Frame Formats

Different frame formats and frame types might be used for the downlink and uplink frames. Depending on requirements, the frame formats/types might be those used elsewhere. For example, if the PWN is an 802.11x WLAN network and the SWN uses an overlay protocol that is an overlay with respect to the 802.11x WLAN protocol, the frame formats/types might be of a form that a PWN device does not entirely understand, but understands enough to defer for a period to allow for SWN communication.

In one embodiment, the first frame transmitted by the COORD (the downlink frame) is an 802.11x Clear-to-Send ("CTS") frame with increased duration field, and can be self-addressed or addressed to the PER.

In another embodiment, the downlink frame can be an 802.11x HCCA-CF frame of type data addressed to the PER and with the duration field increased, with the subtype field "data" cleared and the subtype field "poll" set. In yet another embodiment, this frame can be an 802.11x HCCA data frame addressed to the PER and with increased duration field, with the subtype fields "data" and "poll" both set, and with the data/information intended for the PER (that is downlink data/information) included in the payload. Other variations of HCCA frames might also be possible.

Typically, HCCA frames are only used for communication within a PWN (WLAN) to handle, for example, allocation of transmission opportunities. HCCA frames are used for communication between an AP and a STA of a PWN where the STA has set up a TS with the AP of the PWN. In that case, an HCCA-CF data frame of subtype "poll" might be transmitted by an AP using an access scheme that is prioritized over the access schemes used by non-AP STAs. A novel use of HCCA frame formats and arrangements is disclosed in this invention, where HCCA frame formats and modifications thereof and/or novel WM access schemes are used for communication with PERs in an SWN. Modifications may include but are not limited to the use of specific SWN-related information like the SWN's BSSID or the use of the "to DS" and "from DS" fields in the HCCA frame header (e.g., "To DS" and "From DS" both set to 0) to distinguish SWN (WPAN) traffic from regular PWN (WLAN) HCCA traffic. Indeed, PWN (WLAN) HCCA frames are always directed to or from an AP, resulting in either the "To DS" or "From DS" fields to be set to 1.

In addition, this invention describes a novel use of HCCA frames, in that such frames are transmitted by a non-AP STA following non-AP medium access schemes. As an example, in a specific embodiment, an HCCA-CF data frame of subtype "poll" may be transmitted by a non-AP STA using basic non-AP access schemes or possibly using the non-AP STA's priority queues (for example, the HCCA frame may be transmitted over the highest priority queue for Voice traffic (AC_VO)). Moreover, the wireless medium is reserved without colliding with an AP that may be using regular HCCA-CF frames of subtype "poll", as might be the case if there was a 1 PIFS delay before accessing the WM. HCCA-CF frames are used by access points to ask a STA for a response to the HCCA, but they are used in this example in a different way, for a different purpose.

In a specific embodiment, a dual-net device may decide to use some of the services from its PWN to schedule communication with PER devices in its SWN. As an example, if the dual-net device's PWN is an 802.11x WLAN, it may set up an 802.11 Traffic Stream ("TS") with one or more PER devices and use 802.11 mechanisms such as TSPEC and TCLAS (or modifications thereof) to communicate the length of SIs, the start of an SP and the like with its PER devices. Unlike a conventional 802.11 network, where such communication and negotiation occurs with an AP, when used for communication within a wireless PAN, specific communication with the AP of the PWN may be suppressed. As an example, the dual-net device may suppress the transmission of elements like "ADDTS" and "DELTS" to the AP it is associated with on its PWN.

In such an embodiment, a PER may initiate the creation of a Traffic Stream (TS) to request the COORD for TXOPs, both for its own transmissions as well as for transmissions from the COORD to itself. In a specific implementation of this embodiment, a PER sends an Add Traffic Stream (ADDTS) request frame to the COORD. The ADDTS request frames may use Traffic Specification (TSPEC) and optionally Traffic Classification (TCLAS) elements in its frame body containing the set of parameters that define the characteristics and QoS expectations of the TS. The Service Start Time, Minimum Service Interval and Maximum Service Interval fields in the TSPEC element may be used to request a desired service period (SP) or update period as well as service time or update time. In response to an ADDTS request frame, the COORD may send an ADDTS response frame. This ADDTS response frame may use the TSPEC, TCLAS and schedule element in its frame body to exchange relevant parameters and announce the schedule that the COORD will follow for traffic with the PER in the future. Following a successful negotiation, a TS is created. Once a TS has been created, the COORD polls the PER at the pre-negotiated service start time and with the pre-negotiated service intervals. For this, HCCA-CF poll frames, possibly with an identifier to indicate secondary network communication, may be used. And HCCA-CF data frames may be used to respond.

Different 802.11x frame formats, frame types, frame subtypes and modifications thereof may also be used. As an example, management frames or data frames might be used. Specific fields in such frames may be adapted to indicate that the frames are part of a SWN overlay protocol. In some embodiments, regular frames are used, with their BSSID set to the PAN's BSSID. Alternatively, HCCA frames or similar are used.

Direct Link Protocol

When the PWN is a WLAN network based on the 802.11x WLAN protocol, a mechanism specified in the 802.11e specification, called Direct Link Protocol or "DLP" may be re-used in a novel way to implement or facilitate the communication in the SWN.

Figure 14:
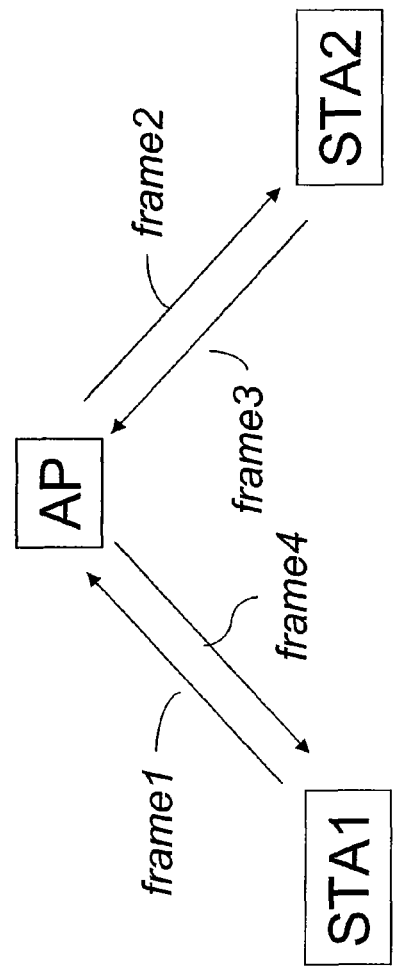
FIG. 14 is a schematic diagram illustrating steps of a direct link handshake.

In one embodiment, the peripheral service function initiates a Direct Link Set-up ("DLS"). DLS is being specified in the 802.11e specification as a protocol that allows two non-AP STAs in the same wireless LAN BSS to exchange frames directly without relying on the AP for the delivery of the frames, and without having to disassociate from the wireless LAN network. FIG. 14 illustrates the steps involved in a regular direct link ("DL") handshake. A station STA1 that intends to exchange frames directly with another non-AP station STA2, invokes DLS by sending a DLS request frame, frame 1, to the AP. Among other parameters, this request contains the MAC address of STA1 (source) and STA2 (destination). If STA2 is associated in the BSS, the AP can forward the DLS request to STA2, frame 2. If STA2 accepts the direct stream, it sends a DLS response frame, frame 3, to the AP, which among other parameters contains the MAC addresses of STA1 and STA2. The AP forwards the DLS response to STA1, frame 4, after which the DL becomes active and frames can be sent from STA1 to STA2 and from STA2 to STA1 without relying on the AP.

According to the 802.11e specification, a Direct Link Set-up can only be requested for any two STAs that are associated with the same BSS. This is not directly applicable to communication between a COORD and a PER, since a PER is not associated with the primary network BSS. Therefore, a standard DLS cannot be used. Below, two novel methods are presented that allow the use of DLS between two STAs, only one of which is associated with a wireless LAN BSS. Both methods are described in more detail below. The STA that is associated with the wireless LAN BSS is referred to as the COORD, whereas the other STA is referred to as the PER.

Figure 15:
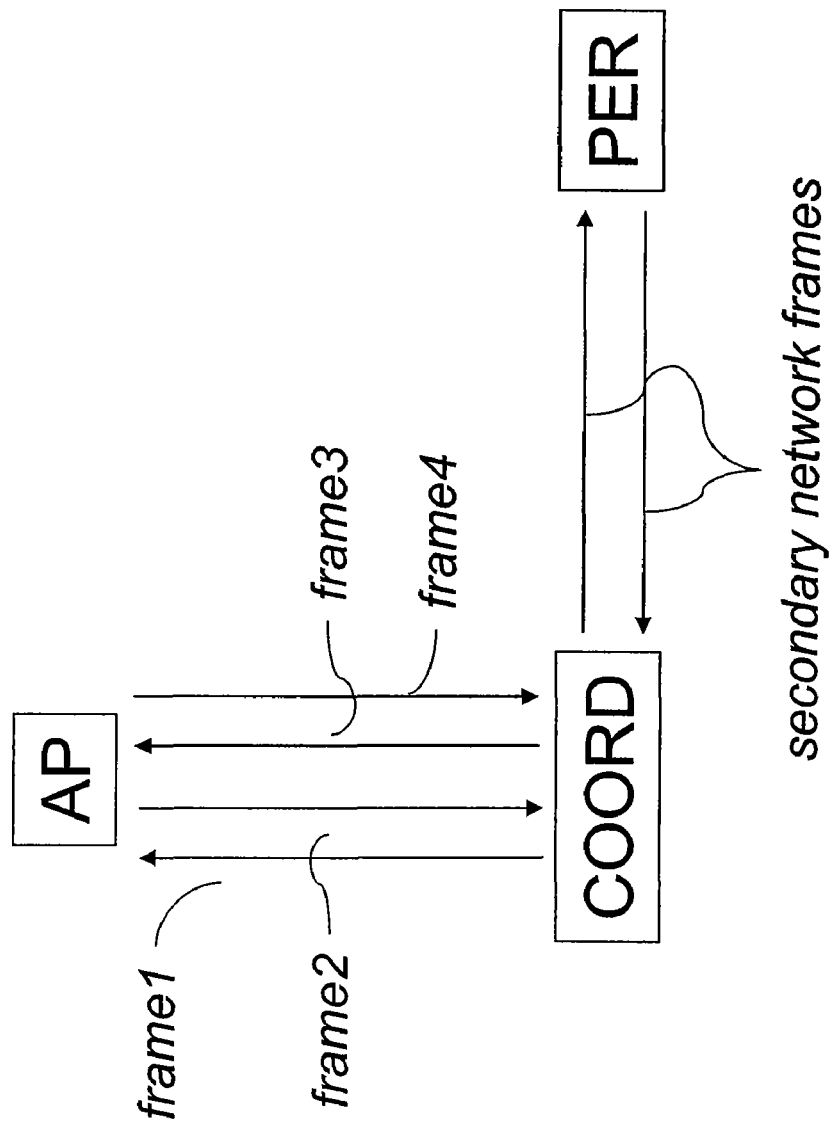
FIG. 15 is a schematic diagram illustrating steps of a using a direct link setup between two STAs.

A first method is illustrated in FIG. 15. In this method, the COORD sends a DLS request frame to the AP of the primary network, frame 1, requesting a self-addressed Direct Link (DL). This can be achieved by setting both the source and destination MAC address in the body of the DLS request frame equal to the COORD's MAC address. The DLS timeout value can be set to zero such that the DL is never terminated based on a timeout. Alternatively, the DLS timeout value can be set to a value corresponding to a time period at the expiration of which it is desirable that the DL be terminated. In response to a DLS request frame, the AP forwards the request, frame 2, in this case back to the COORD. The COORD accepts the direct stream and sends a DLS response frame to the AP, frame 3. The AP forwards this response to the STA specified by the MAC address in the DLS response frame, in this case back to the COORD, frame 4. At the end of DLS handshake, the COORD can communicate directly with a PER in the secondary network without disassociating from the primary network by using secondary network frames. A secondary network frame is the same or similar to a regular primary network frame but both the source address (SA) and destination address (DA) are set equal to the COORD's MAC address. In such frames the MAC address of the PER is included in a different field. In one embodiment, the MAC address of the PER can be part of the frame body field.

In an alternative method, the COORD uses an indirect association and authentication procedure to set up an authentication and association for the PER with the AP. Once the PER has been associated and authenticated (indirectly) with the AP, the COORD may initiate a DLS with the AP by sending a DLS request frame with the source MAC address set to the COORD's MAC address and the destination MAC address set to the PER's MAC address. During the DLS procedure, the COORD responds to all frames sent by the AP of its primary network, including frames that are addressed to the PER.

Connectivity States

The overlay protocol described herein might support multiple connectivity states to meet typical wireless PAN needs, such as power conservation, low latency requirements or the desire to minimize the network capacity taken up by a single PER device. The latter is particularly important if a large number of PER devices are operating within a common wireless networking space, possible coexisting with a large number of WLAN STAs sharing the same common wireless networking medium.

Figure 16:
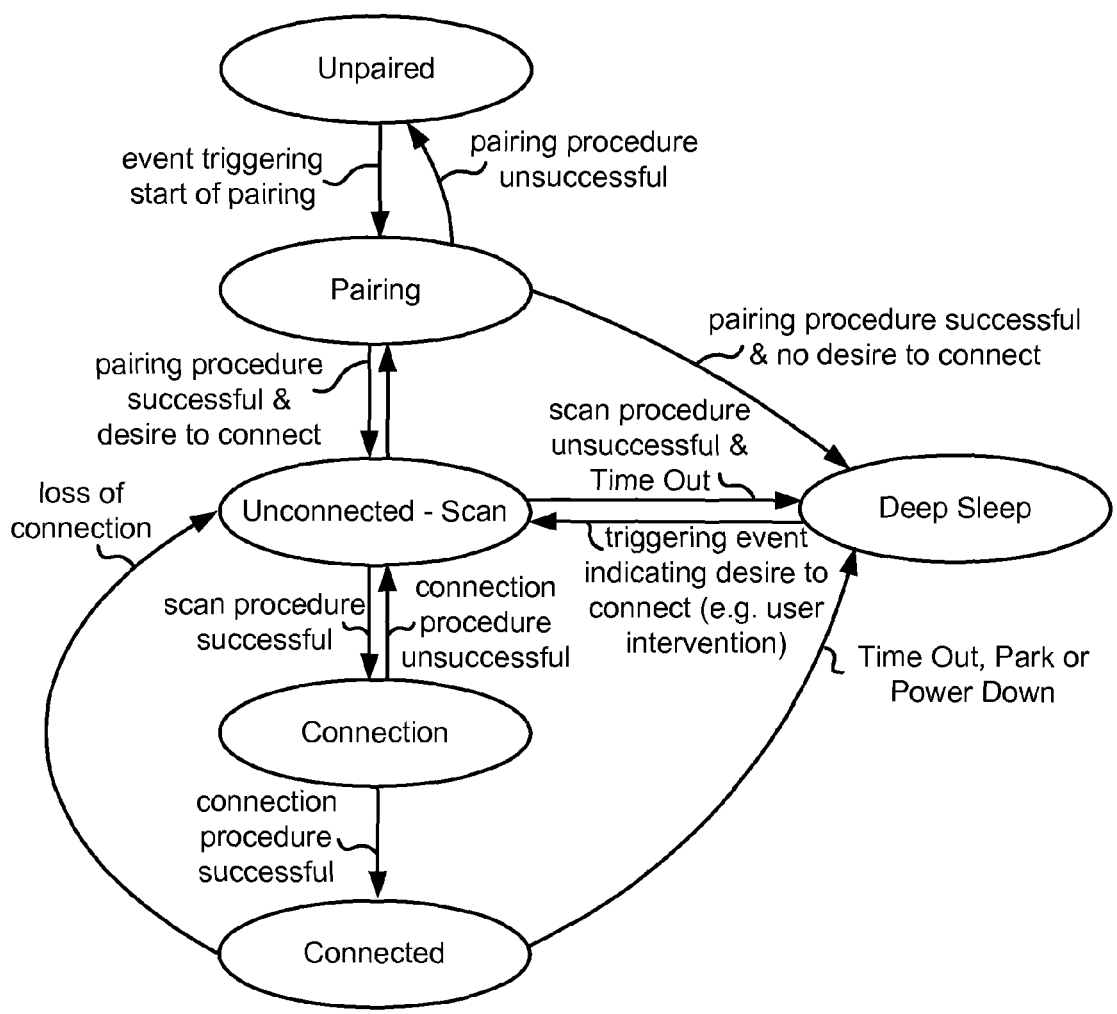
FIG. 16 is a state diagram for an embodiment of stateful operation of a COORD (which might be used for a dual-net device or otherwise) and/or a PER.

A possible state diagram illustrating connectivity states for a wireless PAN device is illustrated in FIG. 16. It should be understood that this is one example of a state diagram and devices might implement other state diagrams instead. Thus, this detailed example is for illustrative purposes only. For example, a different state diagram might be applicable if a single COORD coordinates multiple PER devices.

"Connected"

When in the CONNECTED state, the COORD and PER have agreed upon inactivity times, and communicate at agreed upon time intervals to exchange frames using frame formats, arrangements and sequences described herein. In addition, each is aware of the other, i.e., they know relevant addresses, etc., from prior communication that occurred during prior states (as described below). Before entering the CONNECTED state, a COORD and PER might first go through a PAIRING, an UNCONNECTED-SCAN and a CONNECTION state.

To conserve power, the connected state might support different activity levels. As an example, the Service Interval may be increased when no data were sent for a specific length of time.

"Pairing"

The first step in establishing a new connection is device PAIRING. Device pairing comprises the first time configuration steps for linking a PER to a COORD. The pairing procedure typically comprises at least two steps: device discovery and a security pre-shared key exchange.

Device Discovery

During the device discovery procedure, MAC address information is exchanged between the COORD and the PER. A dedicated configuration pushbutton or a simple user action can be used to initiate device discovery. Other mechanisms are also possible, and several mechanisms have been documented in the literature. The exact mechanism to initiate device discovery is beyond the scope of this invention. Upon such user intervention, the COORD and PER might both enter a "limited discoverable mode" for a certain period of time that is long enough to finish the device discovery procedure. Both COORD and PER can initiate the discovery procedure. The device that initiates the discovery procedure is called the "initiator"; the other device is hereafter referred to as the "follower".

Upon entering discoverable mode, the initiator sends a broadcast discovery request. The broadcast discovery request is a broadcast frame, and may contain information such as the initiator's MAC address, and the type of devices that should respond. A follower in discoverable mode responds to a broadcast discovery request with a discovery response. The discovery response frame is a unicast frame that is addressed to the initiator.

For security reasons, it is advisable that the amount of information exchanged while in discoverable mode is minimized. However, if appropriate, additional information can be exchanged during the device discovery procedure. For example, if generated by the COORD, the broadcast discovery frame may optionally contain information on the WLAN connectivity status (infrastructure/ad-hoc/unconnected, operating channel, power-save, etc.). If generated by the PER, the broadcast discovery frame may optionally contain information about the type of PER.

In one embodiment, the COORD acts as the initiator and sends an 802.11x probe request frame. The SSID parameter of the broadcast probe request frame may be used to communicate specific information to the PER, in this case the follower. More specifically, the SSID field in the frame body can be used as a frame type identifier and to send additional information to a follower. For example, specific bits of the SSID can be used to identify the over-the-air protocol. Other bits of the SSID can be reserved to identify the frame as a broadcast discovery request frame. The remainder of the bits can be reserved or used to communicate additional information about the COORD or the wireless LAN network it is associated with to the PER (follower).

In another embodiment, a data frame or standard or proprietary IBSS beacon frame or other management frame is used as a broadcast discovery request frame.

Upon receiving the broadcast device discovery request frame, the PER in discoverable mode (the follower) responds by sending a unicast discovery response frame. This can be a unicast 802.11x probe response frame. The probe response frame is addressed to the initiator, and structured such that it is recognized as a discovery response frame by the initiator. Alternatively, the discovery response frame can be a data frame formatted to be recognized by the COORD as a discovery response frame.

A device discovery channel can be pre-defined in the protocol. In that case, an initiator put into discoverable mode will, by default, start sending broadcast discovery requests on the pre-defined channel, and a follower put in discoverable mode will, by default, listen for a broadcast discovery request on the pre-defined channel.

When device discovery is initiated, and no device discovery channel is pre-defined, the initiator and follower may need to search for each other. Either the initiator or the follower may perform this search. If the initiator performs the search, the follower listens on a fixed channel, while the initiator scans different channels, by subsequently transmitting broadcast discovery request frames on different channels. Alternatively, when the follower performs the search, the initiator transmits broadcast discovery request frames on a fixed channel at Tdiscovery time intervals, while the follower performs a passive scan by listening for a broadcast discovery request on different channels. Note that the follower should stay on a single channel for at least Tdiscovery to ensure it will capture a broadcast discovery frame.

At the conclusion of the device discovery procedure, at a minimum, the initiator and follower have knowledge of each other's MAC address and current operating channel of the COORD's primary network.

Security Key Exchange

Initial key set-up and key management constitutes an important aspect of secure wireless communication. The IEEE 802.11 standard specifies that the secret shared key be delivered to participating stations via a secure channel that is independent of IEEE 802.11. This is not necessarily possible when attaching a power-sensitive device like a PER. Over-the-air transmissions may be required to distribute a pre-shared encryption key between participating stations.

Preferably, not the key itself, but the minimum required key information from which the secret shared key can be derived by both sides of the link is transmitted over-the-air.

After completing the device discovery procedure, the COORD and PER exchange the necessary information to acquire common knowledge of a shared secret key. This process is referred to as the key setup, and the shared secret key exchanged in this phase is called the pre-shared key. Several actions may be taken to minimize chances of a pre-shared key interception. Such actions may include, but are not limited to, (1) sending critical information from PER to COORD, (2) intentionally reducing power levels for pre-shared key information exchanges, and/or (3) using a key exchange process, such as Diffie-Hellman, to avoid having critical key information transmitted over the air in the clear. Sending critical information from PER to COORD reduces the chances of interception, since the transmission range of a PER might be significantly lower that that of a COORD.

The pre-shared key is stored and can be used for encryption of frames by the driver or firmware that performs the encryption of frames for communication in the secondary network. For security reasons, it is often desirable to regularly update the shared key. The pre-shared key can be used to encrypt one or more temporary keys before they are transmitted over the air. These temporary keys are then used for encryption and authentication of data.

The COORD may initiate the initial key exchange, and may reserve the WM by increasing the duration field of the frame it sends to a PER. During the initial key exchange, frames sent to a PER should not be encrypted. If the COORD is a dual-net device, this can be achieved by either turning off encryption in the COORD's 802.11x device driver or firmware or passing the frame on to the 802.11x device driver beyond the encryption point. Similarly, frames received from the PER during the initial key exchange should not be decrypted by the 802.11 device driver or firmware. This is achieved either by turning off encryption in the COORD's 802.11x device driver or firmware, or by making sure that the received frame is passed on to the peripheral service function prior to decryption in the 802.11x device driver or firmware. Furthermore, the data rate of frame transmissions is set to the maximum data rate supported by the PER.

Completion of Pairing Procedure

After successful completion of the pairing procedure, the MAC address of the COORD and the shared key information are stored inside the PER, and the MAC address of the PER and the shared key information are stored inside the COORD. Both the COORD and PER abandon the limited discoverable mode. The COORD and PER are now paired. After completion of the pairing procedure, the COORD continues its regular WLAN activity.

The PER may subsequently decide to go enter the DEEP-SLEEP state or enter the UNCONNECTED-SCAN state.

BSS Notification

In case where the COORD, STA1, is associated with a primary network BSS1, prior to starting the pairing procedure, it may be desirable to notify the AP of BSS1 that STA1 will be temporarily unavailable. This may be important to avoid the situation where BSS1 tries to communicate with STA1 while STA1 is occupied with the pairing. The BSS1 traffic may even be on a different channel (such as where there is a pre-defined discovery channel). If non-responsive, the AP might drop STA1 from association with the AP.

A first method may comprise temporarily disassociating the client from the primary network, BSS1. Since the pairing procedure is normally done only once, at initial set-up, it may in many applications be acceptable that, for the duration of the pairing procedure, STA1 temporarily disassociates from BSS1.

In a second method, STA1 may notify the AP of its primary network BSS1 of its temporary unavailability by sending a frame with the power management bit set. After completing the pairing procedure, STA1 may send a frame to the AP of BSS1 with the power management bit cleared.

"Unconnected-Scan"

When in the UNCONNECTED-SCAN state, a PER device tries to detect the COORD that it is paired with. Various scanning and device detection schemes might be used when in the UNCONNECTED-SCAN state.

In one embodiment, the connection request frame is a probe request frame and can be generated with a scan request. The broadcast probe request frame may have the SSID programmed to be interpreted by the PER as a connection request frame. The SSID may, among other parameters, contain the PER's MAC address information, a secondary network protocol identifier, and a connection request frame identifier. It may furthermore contain relevant additional parameters, such as the wireless LAN connection mode (infrastructure versus ad-hoc versus no connect), the operating channel of the COORD's wireless LAN connection, etc. The COORD may also reserve the WM for a single response frame from the PER. The protocol states described herein (ACTIVE, PAIRING, etc.) might collectively define portions of a secondary network protocol.

In another embodiment, a data frame or a standard or proprietary IBSS beacon frame may be used as a connection request frame. Alternative management, control or data frames beyond the above specified examples may also be used as connection request frames.

As with the pairing procedure, the connection request frames are either transmitted on a pre-defined channel, or a COORD- or PER-initiated search may be used to establish connection.

"Connection"

A connection procedure can be initiated at any time between a PER and a COORD that are paired, have detected each other, but are not yet connected. The purpose of the connection procedure is to prepare the COORD and PER for regular frame exchange ("ACTIVE state"). During the connection procedure, the PER and COORD are synchronized and, optionally, a new shared encryption key is exchanged.

Authentication

Optionally, an authentication procedure may be added prior to data exchange to ensure that the claimed recipient is indeed the intended recipient. A standard shared key authentication procedure, already supported by the 802.11x stack, may be used for authentication. Alternatively, a new authentication mechanism may be implemented in the 802.11x peripheral service function.

Update Shared Encryption Key

For security reasons, it may be desirable to regularly update the encryption key, so that even if the key is intercepted, the connection is not insecure indefinitely. In one specific embodiment, the encryption key is temporary and may be updated every time a new connection is established. In such embodiment, the pre-shared key may be used to exchange information related to the shared encryption key.

Completion of Connection Procedure

Upon completion of the connection procedure, the COORD and the PER are ready to exchange data/voice traffic, and both enter the CONNECTED state. At that point, the PER has knowledge of the operating channel and other relevant parameters related to the COORD's primary network.

Similar as during the pairing procedure, it may be desirable that the COORD notifies the AP of its primary network that it will temporarily be unavailable. This can among other mechanisms be done by sending a frame to the AP with the power management bit set. After completion of the connection procedure, COORD may send a frame to the AP with the power management bit cleared.

"Deepsleep"

If there has been no traffic for a time longer than a pre-defined time interval Ttime_out, the PER may enter the DEEPSLEEP state. In the DEEPSLEEP state, the PER powers down most or all of its circuits and does no longer stay synchronized to the COORD. When in the DEEPSLEEP state, prior to go back to ACTIVE state, the PER first goes through the UNCONNECTED-SCAN and CONNECTION states.

Alternatively, the PER may enter the DEEPSLEEP state after a power-down event, when failing to receive frames from the COORD or when receiving a PARK request from the COORD or from a higher level management layer.

When the PER has entered the DEEPSLEEP state, the COORD might determine to switch to the UNCONNECTED-SCAN state, where it periodically or occasionally checks whether a PER is trying to connect. Optionally, all connections might use a fixed, pre-defined channel for rendezvous.

Overlay Protocol with PWN Feature/Hardware Reuse

In specific embodiments, a computing device is a dual-net device and is interfaced to a wireless local area network (WLAN) and a wireless personal area network (PAN). A network circuit, comprising logic and at least one antenna, interfaces the computing device to the WLAN and including logic to set up a LAN association between the computing device and the access point prior to data transfer therebetween, while also interfacing the computing device to a PAN device via the wireless PAN.

Communication with the wireless PAN device might use an SWN overlay protocol that is only partially compliant with the protocol used over a conventional WLAN and might do so without interference from the conventional WLAN, yet usage of the WLAN is such that the wireless PAN device and computing device can communicate without interference. To reduce interference, the computing device coordinates the usage of the wireless medium with devices of a WLAN that may be active in the same space. Coordination is achieved by the use of a secondary network (PAN) protocol that is an overlay protocol that is partially compatible with the WLAN protocol, but not entirely, in terms of power, frame contents and sequences, timing, etc. The secondary network (PAN) protocols might be 802.11x frames with new frame arrangements adapted for PAN needs, such as reduced latency, power etc. The computing device might determine to signal the primary network (WLAN) such that devices therein defer so that communications can occur with the secondary network. The overlay protocol is preferably such that devices that can join both networks can use a common network interface circuit.

In specific implementations, a shareable network circuit stores parameters, addresses and other information necessary to maintain sessions with both networks simultaneously. As an example, a shareable network circuit may store two media addresses, one for communication in the WLAN and one for communication in the wireless PAN. The network circuit can maintain sessions with both simultaneously. More than two networks and corresponding storage of parameters, addresses and additional network related information might be provided for. A recognition method is provided in the computing device to distinguish and separate traffic from different networks.

Where the PWN is a WLAN typically used for network traffic over a relatively large space, such as a building and the SWN is a PAN is typically used for peripheral traffic over a narrower space, such as a room, a desk, a person's space, etc., the optimum protocols for the two networks are likely to be different such that what works well for one network does not work well for another network. Nevertheless, if a single computing device is to be a part of both networks, it is desirable to re-use specific PWN features and networking hardware for communication in the SWN. Where the first network is an 802.11x network and a computing device includes 802.11x networking equipment, an overlay protocol can be used for the SWN, such that 802.11x equipment can be co-opted for use with the SWN, optimized to deal with some of the differing requirements of the two networks.

The overlay protocol allows a dual-net device that is associated with a PWN to exchange information, possibly on the same channel as the primary network, with PERs that are a member of a SWN, and not a member of the PWN, and that may or may not be within the coverage range of the PWN. Access to specific lower level primitives in the 802.11x stack, like the ability to overwrite a frame's duration field, or the ability to transmit/receive on a separate SWN BSSID may or may not be necessary.

As an example of PWN feature reuse, the SWN overlay protocol may use modulations schemes supported by the PWN protocol, so as to enable re-use of the modulation/demodulation logic in the 802.11x equipment. As another example of PWN feature reuse, the SWN overlay protocol may use 802.11x frame arrangements and modifications thereof, so as to ensure that frames in the SWN can be transmitted and received by the 802.11x hardware.

In a specific implementation, for a dual-net device to maintain multiple sessions simultaneously, it stores two media addresses, one for communication with devices in the WLAN and one for communication with devices in the wireless PAN. The media addresses can be network Basic Service Set Identifiers (BSSIDs). The BSSID for the primary network can be the MAC address of the AP of the primary network, and the BSSID for the secondary network can be a MAC address that identifies WPAN traffic. As an example, the BSSID of a secondary network can be the WLAN MAC address of the dual-net device, but it can also be a MAC address that is different from the dual-net device's WLAN MAC address. As another example, the BSSID of the secondary network may be global media address to identify WPAN traffic, that is a single MAC address that uniquely identifies all wireless PAN traffic independent of what COORD the wireless PAN traffic is intended for.

In a different implementation of the protocol however, the BSSID of the PWN is re-used and a separate MAC address for the communication in the SWN is not needed.

More than two networks and corresponding storage of addresses and parameters might be provided for.

A dual-net device that is simultaneously maintaining a session with a WLAN and a wireless PAN can use a packet recognition mechanism to distinguish traffic in the PWN (the WLAN) from traffic in the SWN (the wireless PAN).

In a specific implementation where the wireless PAN BSSID is different from the WLAN BSSID, a dual-net device can use the BSSID in the packet to distinguish traffic in the primary network from traffic in the secondary network.

Other identification mechanisms, like an Ethertype, an organizationally unique identifier (OUI), specific reserved bits in an 802.11x packet etc. may also be used to identify wireless PAN traffic.

In yet another implementation, the SWN protocol may be such that the dual-net device knows when a wireless PAN frame can be expected. An example of such protocol is a "polling-based" protocol where a PER only sends a frame to its COORD in response to reception of a frame from its COORD. If the dual-net device knows when to expect a wireless PAN frame, it can prepare a temporary buffer for such frame. In the above example, each time the COORD transmits a frame that is intended for a PER, a temporary buffer for a single reply frame might be provided. This identification method works if a PER does not access the WM autonomously, and responds to a frame for the COORD with a single reply frame. The method can easily be extended, using the teachings herein, to the scenario where a PER responds to a frame from the COORD with multiple reply frames by increasing the size of the temporary buffer.

In yet another embodiment, a modified 802.11x frame format is used for communication in the SWN. For example, HCCA data frames with "from DS" and "toDS" fields both cleared might automatically be recognized by the 802.11x stack as wireless PAN traffic.

Alternatively, if no recognition mechanism is provided by the 802.11x stack, all received frames can be propagated up to the 802.11x peripheral service function, and a recognition mechanism implemented inside the 802.11x peripheral service function selects the frame originating from a PER.

In addition to a recognition mechanism to distinguish WLAN traffic from wireless PAN traffic, an additional recognition method may be needed to distinguish traffic from separate wireless PANs. As an example, two or more COORDs of separate wireless PANs may be sharing a common wireless networking medium. If that is the case, a COORD may be receiving frames from devices that belong to different wireless PANs and should be configured to distinguish frames from its own wireless PAN from those that belong to a different wireless PAN. If a different media address is used for each wireless PAN (for example, each wireless PAN has a unique wireless PAN BSSID), then identification can be done based on such media address.

In a specific implementation, a global unique media address may be used to globally identify all wireless PAN traffic. As an example, a global unique BSSID may be used to identify all wireless PAN traffic. In such implementations, an additional identification mechanism may be required to allow a COORD to identify the wireless PAN traffic for which it is the intended recipient. As an example, the Destination Address ("DA") or Receiver Address "RA") field of the 802.11x packets can be used as such identifier. The DA or RA can, for example, be the WLAN MAC address of the COORD. Other similar approaches can be used instead.

Variations

In a common operation, a link is established between a network circuit and a BSS while simultaneously linked with a secondary network device. In one variation, some aspects could also be used to establish a link between a standard 802.11x card and a power-sensitive device, even if the standard 802.11x card is not simultaneously connected to a BSS. For example, in a GSM/WiFi combo phone, the device might be handling a call over the cellular network and the WiFi card could still be used for headset connectivity.

Figure 17:
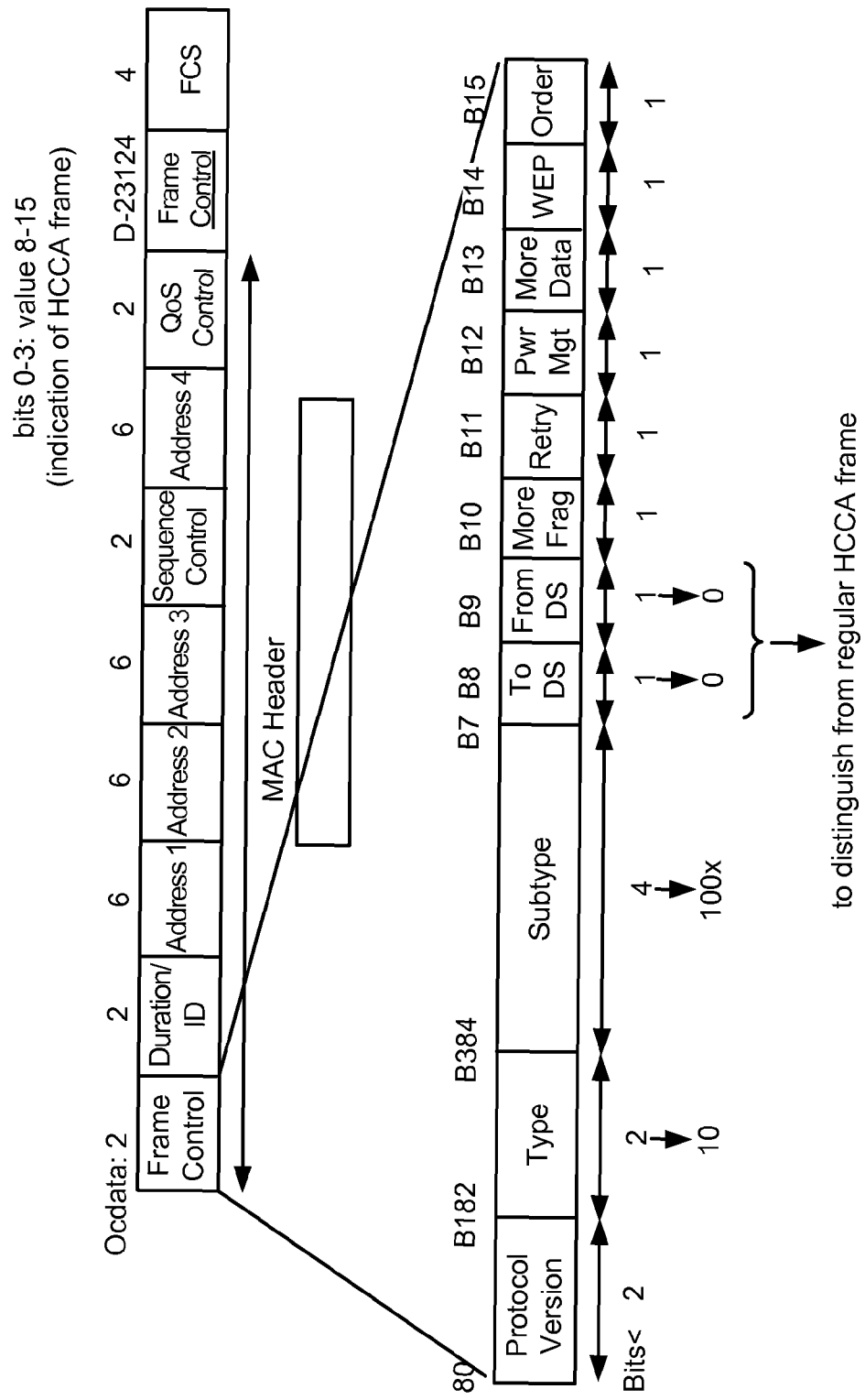
FIG. 17 is a schematic diagram of frame formats usable for a non-standard HCCA frame.

In the 802.11e draft, HCCA is proposed to be used by the QAP to schedule traffic with QSTAs. In embodiments described herein, it is used for communication in secondary network. Thus, while COORD is regular client in the primary network, difference can be signalled with specific fields in frame set differently (e.g., "to ds" and "from ds" both set to zeroes, or via the use of some of the reserved bits). An example is shown in FIG. 17.

Additionally, in order not to interfere with other "real" HCCA APs, a different access procedure can be used (e.g., use the VoIP queue instead of PIFS). The HCCA mechanism can be reused for a service request (i.e., a connection) using ADDTS request and response frames with TSPEC and schedule element, for HCCA CF polls (e.g., COORD polling the PER in CONNECTED state), and/or for schedule frame for changing update interval either because PER goes into SNIFF mode or in case of congestion of the medium to free up the WM and save power inside PER.

In many of the examples described herein, one feature is the use of a common PHY and MAC layer for two networks, one being a conventional 802.11x network with a BSSID and the other being a secondary network connecting what would otherwise be an 802.11x STA with peripherals and other low-power, low-range devices. In a more general case in another network model, there is common use of a modulation scheme and a frame formatting layer, wherein the PHY and MAC are specific instances.

In many of the examples described herein, the station device is wirelessly coupled to an 802.11x access point while being active with devices over the secondary network. In other variations, the station device is wirelessly coupled to another station over a direct link while being active with devices over the secondary network. In yet other variations, the station device may be the AP of the primary network, while also being the COORD for the secondary network.

In some embodiments, the communication between the COORD and one or more PERs of the SWN occurs in the same frequency band and on the same frequency channel as the communication of the PWN.

In other embodiments, the communication between the COORD and one or more PERs of the SWN occurs in the same frequency band as the communication in the PWN, but on a different frequency channel than the communication within the PWN. As an example, channel switching may be desirable if the frequency channel of the PWN is crowded, or the SWN application requires a high Quality of Service (QoS).

In other embodiments, the communication between the COORD and one or more PERs of the SWN occurs in a different frequency band and, therefore also on a different frequency channel, as the communication of the PWN. As an example, frequency band switching is necessary if the primary network is in an 802.11a mode, operating in the 5 GHz unlicensed frequency band and the PER only supports communication in the 2.4 GHz unlicensed frequency band, or vice versa.

In still further embodiments, the dual-net device may be communicating in a different mode with the PWN and the SWN. As an example, the COORD may be communicating in an 802.11g mode inside the PWN while using an 802.11b mode for communication within the SWN, or vice versa. In such embodiment, the communication within the SWN can be on the same or on a different frequency channel as the PWN.

In yet another embodiment, communication in the SWN uses the same mode as the PWN, with both networks using different data rates or where it is not known whether the data rates are different or the same (such as where they are set independently). For example, the COORD might transmit frames at the same data rate as its data rate for communication within the primary network while the PER communicates with the COORD using a different data rate.

Different data rates might be used for downlink and uplink communication within the SWN. Alternatively, the same data rate is used for downlink and uplink communication within the SWN and this data rate is different from the data rate used by the dual-net device for communication within the PWN. It is also possible that the data rates for PWN and SWN communication are set independently, but at certain moments in time turn out to be the same.

In the typical embodiment in an 802.11x environment, an 802.11x client can talk to an access point and devices in the secondary network without losing synchronization and association and without requiring a reset of a connection at the 802.11x client. The 802.11x client can reserve a wireless medium for a weak peripheral, effectively solving a "hidden node" problem for the low-power peripheral or other such device.

In a common operation, a link is established between a network circuit and a BSS while simultaneously linked with a secondary network device. In one variation, some aspects could also be used to establish a link between a standard 802.11x card and a power-sensitive device, even if the standard 802.11x card is not simultaneously connected to a BSS. For example, in a GSM/WiFi combo phone, the device might be handling a call over the cellular network and the WiFi card could still be used for headset connectivity.

In many of the examples described herein, one feature is the use of a common PHY and MAC layer for two networks, one being a conventional 802.11x network with a BSSID and the other being a secondary network connecting what would otherwise be an 802.11x STA with peripherals and other low-power, short-range devices. In some embodiments, only part of the MAC layer is in common and other variations are possible. In a more general case in another network model, there is common use of a modulation scheme and a frame formatting layer, wherein the PHY and MAC are specific instances.

In many of the examples described herein, the station device is wirelessly coupled to an 802.11x access point while being active with devices over the SWN. In other variations, the station device is wirelessly coupled to another station over a direct link while being active with devices over the SWN. In yet other variations, the station device may be the AP of the PWN, while also being the COORD for the SWN.

In the typical embodiment in an 802.11x environment, an 802.11x STA can talk to an access point and to devices in the SWN without losing synchronization and association and without requiring a reset of a connection at the 802.11x STA. The 802.11x STA can reserve a wireless medium for a weak peripheral, effectively solving a "hidden node" problem for the low-power peripheral or other such device.

In many of the examples herein, where a device is described as a dual-net device it is intended to be a description of a device that can be a coordinator for a SWN while being a station in a PWN. Often the description of operations, features and/or elements of the dual-net devices also apply to secondary wireless PAN COORDs that may not have a capability to become a full node in the primary network.

Even where differences between the PWN and SWN are such that they don't interfere, the COORD might still reserve the WM, to avoid signals from elsewhere interfering.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method of communicating between devices of a personal area network (PAN) using a wireless medium that is shared with a wireless local area network (WLAN), the method comprising: obtaining access to the wireless medium for a PAN coordinator device, wherein access to the wireless medium is allocated to the PAN coordinator device; signaling a reservation of the wireless medium by the PAN coordinator device, such that other WLAN devices receiving the signaling defer use of the wireless medium for a reservation period, the reservation being signaled by the PAN coordinator device using one or more frames of a PAN protocol that are at least partially understandable by the other WLAN devices, wherein the WLAN is an 802.1 lx network and the one or more frames of the PAN protocol are 802.1 lx frames directed to a PAN device and include in a header of the frames, an increased duration field; and communicating, using the PAN protocol, between the PAN coordinator device and a PAN device over the wireless medium during the reservation period.

2. The method of claim 1, wherein the one or more frames using the PAN protocol comprise a frame directed to a PAN device having an increased duration field.

3. The method of claim 2, wherein the one or more frames using the PAN protocol comprise an 802.11x CTS frame with an increased duration field.

4. The method of claim 2, wherein the one or more frames using the PAN protocol comprise an 802.11x frame or modification thereof, transmitted using a highest priority queue.

5. The method of claim 2, wherein the one or more frames using the PAN protocol comprise an HCCA-CF poll frame having a plurality of subtype fields including a "data" subtype field and a "poll" subtype field, wherein the HCCA-CF poll frame is sent with its "data" subtype field cleared and its "poll" subtype field set.

6. The method of claim 2, wherein the one or more frames using the PAN protocol comprise a modified HCCA-CF poll frame that is partially compliant with WLAN protocol, the modified HCCA-CF poll frame having a plurality of subtype fields including a "data" subtype field and a "poll" subtype field, wherein the HCCA-CF poll frame is sent with its "data" subtype field cleared and its "poll" subtype field set.

7. The method of claim 2, wherein the one or more PAN protocol frames includes data addressed to a PAN device.

8. The method of claim 2, wherein the one or more frames using the PAN protocol comprise an HCCA-CF poll frame having a plurality of subtype fields including a "to DS" subtype field and a "from DS" subtype field, wherein the HCCA-CF poll frame is sent with both subtype fields cleared.

9. The method of claim 2, wherein the one or more PAN protocol frames are transmitted using a highest priority queue.

10. A wireless network interface circuit for communicating between devices of a personal area network (PAN) using a wireless medium that is shared with a wireless local area network (WLAN), the circuit comprising:

circuitry for conveying signals between the wireless network interface circuit and a computing device to which the wireless network interface circuit is electrically coupled;

logic for obtaining access to the wireless medium;

logic for signaling a reservation of the wireless medium, such that other WLAN devices receiving the signaling defer use of the wireless medium for a reservation period, the reservation being signaled using one or more frames of a PAN protocol that are at least partially understandable by the other WLAN devices, wherein the WLAN is an 802.1 lx network and the one or more frames of the PAN protocol are 802.1 lx frames directed to a PAN device and include in a header of the frames, an increased duration field; and logic for communicating, using the PAN protocol, with a PAN device over the wireless medium during the reservation period.

11. The circuit of claim 10, wherein the one or more frames using the PAN protocol comprise a frame directed to a PAN device having an increased duration field.

12. The circuit of claim 10, wherein the one or more frames using the PAN protocol comprise an 802.11x CTS frame with an increased duration field.

13. The circuit of claim 10, wherein the one or more frames using the PAN protocol comprise an 802.11x frame or modification thereof, transmitted using a highest priority queue.

14. The circuit of claim 10, wherein the one or more frames using the PAN protocol comprise an HCCA-CF poll frame having a plurality of subtype fields including a "data" subtype field and a "poll" subtype field, wherein the HCCA-CF poll frame is sent with its "data" subtype field cleared and its "poll" subtype field set.

15. The circuit of claim 10, wherein the one or more frames using the PAN protocol comprise a modified HCCA-CF poll frame that is partially compliant with the WLAN protocol, the modified HCCA-CF poll frame having a plurality of subtype fields including a "data" subtype field and a "poll" subtype field, and wherein the HCCA-CF poll frame is sent with its "data" subtype field cleared and its "poll" subtype field set.

16. The circuit of claim 10, wherein the PAN protocol frame includes data addressed to a PAN device.

17. The circuit of claim 10, wherein the one or more frames using the PAN protocol comprise an HCCA-CF poll frame having a plurality of subtype fields including a "to DS" subtype field and a "from DS" subtype field, wherein the HCCA-CF poll frame is sent with both subtype fields cleared.

18. The circuit of claim 10, wherein the one or more PAN protocol frames are transmitted using a highest priority queue.

* * * * *

UNITED STATES PATENT AND TRADEMARK OFFICE
CERTIFICATE OF CORRECTION

PATENT NO. : 9,913,215 B2  
APPLICATION NO. : 14/589832  
DATED : March 6, 2018  
INVENTOR(S) : Katelijn Vleugels and Roel Peeters It is certified that error appears in the above-identified patent and that said Letters Patent is hereby corrected as shown below:

In the Specification

Column 28, Line 11, delete "that that" and insert -- than that --,

In the Claims

Column 35, Line 19, delete "802.1 lx" and insert -- 802.11x --,

Column 35, Line 21, delete "802.1 lx" and insert -- 802.11x --,

Column 36, Line 16, delete "802.1 lx" and insert -- 802.11x --, and

Column 36, Line 17, delete "802.1 lx" and insert -- 802.11x --.

Signed and Sealed this  
Eighth Day of May, 2018

Andrei Iancu  
*Director of the United States Patent and Trademark Office*